United States Patent [19]
Palmon

[11] Patent Number: 5,740,421
[45] Date of Patent: Apr. 14, 1998

[54] ASSOCIATIVE SEARCH METHOD FOR HETEROGENEOUS DATABASES WITH AN INTEGRATION MECHANISM CONFIGURED TO COMBINE SCHEMA-FREE DATA MODELS SUCH AS A HYPERBASE

[75] Inventor: Eran Palmon, Tel Aviv, Israel

[73] Assignee: DTL Data Technologies Ltd., Tel-Aviv, Israel

[21] Appl. No.: 415,601

[22] Filed: Apr. 3, 1995

[51] Int. Cl.$^6$ ................................................ A06F 17/30
[52] U.S. Cl. ................ 395/604; 395/603; 395/611; 395/612; 395/613
[58] Field of Search ........................ 395/600, 611, 395/612, 613, 604, 603

[56] References Cited

U.S. PATENT DOCUMENTS

| | | | |
|---|---|---|---|
| 5,416,917 | 5/1995 | Adair et al. | 395/500 |
| 5,481,703 | 1/1996 | Kato | 395/600 |
| 5,515,534 | 5/1996 | Chuah et al. | 395/612 |

OTHER PUBLICATIONS

Chawathe et al., "The TSIMMIS Project: Intgration of Heterogeneous Information Sources", in Proceedings of IPSJ Conference, Tokyo, Japan, Oct. 1994.

Uffe Knock Wiil, "Issues in the Design of EHTS: A Multiuser Hypertext System for Colaboration", IEEE on CD ROM, pp. 629–639, Jan. 1992.

"HyperBase Developer Personal HyperBase" http://wwwetb.nlm.nih.gov/author/hyprbase.html, Jul. 1992.

S. Chawathe, H. Garcia-Molina, J. Hammer, K. Ireland, Y. Papakonstantinou, J.Ullman, and J. Widom: "The TSIMMIS Project: Integration of Heterogeneous Information Sources," in Proceedings of IPSJ Conference, Tokyo, Japan, Oct. 1994. Available via anonymous ftp from db.stanford.edu as /pub/chawathe/1994/tsimmis–overview.ps.

Y. Papakonstantinou, H. Garcia-Molina and J. Widom: "Object Exchange Across Heterogeneous Information Sources," in Proceedings of IEEE International Conference on Data Engineering, 6–10 Mar. 1995, Taipei, Taiwan. Available via anonymous ftp from db.stanford.edu as /pub/papakonstantinou/1994/object–exchange–heterogeneous–is.ps.

(List continued on next page.)

*Primary Examiner*—Thomas G. Black
*Assistant Examiner*—Greta L. Robinson
*Attorney, Agent, or Firm*—Dov Rosenfeld

[57] ABSTRACT

A method of performing an associative search on a set of heterogeneous databases is described, the method implemented on a general purpose computer. The method comprises converting each database of the set of databases into a schema-free structure called a hyperbase. The hyperbases corresponding to each database of the set of databases are combined into a single combined hyperbase, and that single hyperbase is normalized into a single normalized hyperbase. An associative search on the single hyperbase includes providing a set of input words. The method of the present invention determines an answer, which is that sub-hyperbase of the hyperbase to be searched which has minimum "cost" according to a criterion. Once an answer is determined, the answer is displayed to the user.

88 Claims, 11 Drawing Sheets

Microfiche Appendix Included
(1 Microfiche, 57 Pages)

OTHER PUBLICATIONS

H. Garcia–Molina, J. Hammer, K. Ireland, Y. Papakonstantinou, J. Ullman, and J. Widom: "Integrating and Accessing Heterogeneous Information Sources in TSIMMIS," in Working Notes of AAAI Spring Symposium on db.stanford.edu as /pub/ullman/1995/tsimmis–abstract–aaai.ps.

M.W. Bright,A.R. Hurson,S. Pakzad, Automatic Resolution of Semantic Heterpgeneity in Multidatabases in ACM Transactions on Database Systems, vol. 19 No. 2, Jun. 1994 pp. 212–253.

M.Gyssens, J.Paradaens,D.Van Gucht, A Grammar–Based Approach Towards Unifying Hierarchical Data Models in SIGMOD Conference proceedings, 1989, pp. 263–272.

A. Poulovassilis, M. Levene,A Nested–Graph Model for the Representation and Manipulation of Complex Objects, in ACM Transaction on Information Systems, vol. 12., No. 1 Jan. 1994, pp. 35–68.

Figure 9(a) (PRIOR ART)
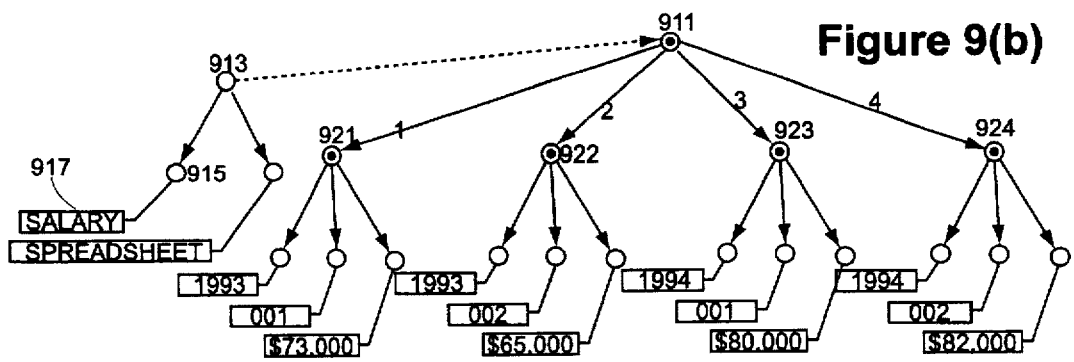
Figure 9(b)
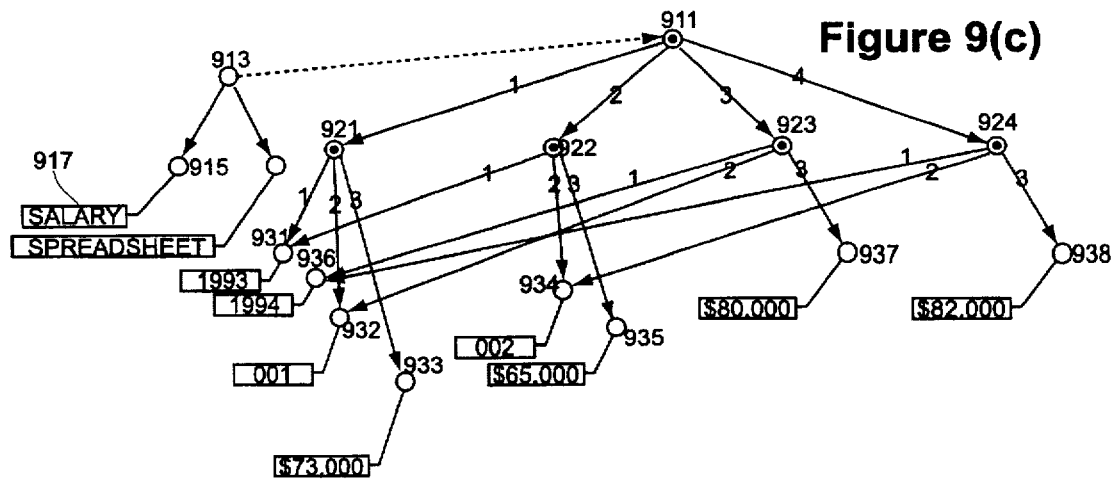
Figure 9(c)

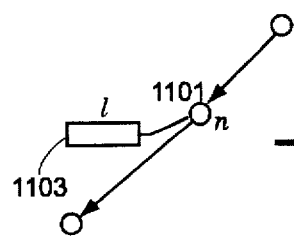 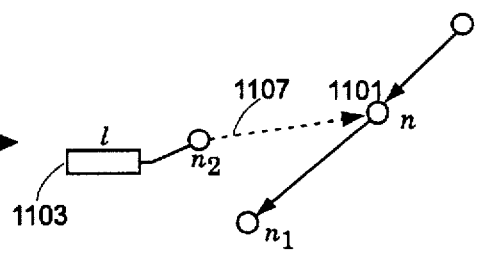
Figure 11(a)  Figure 11(b)
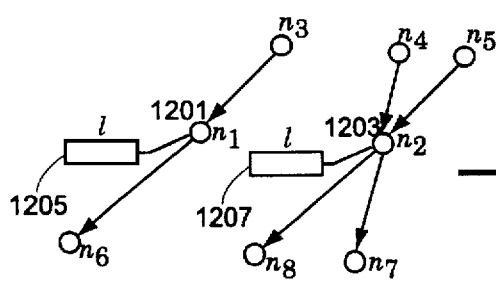 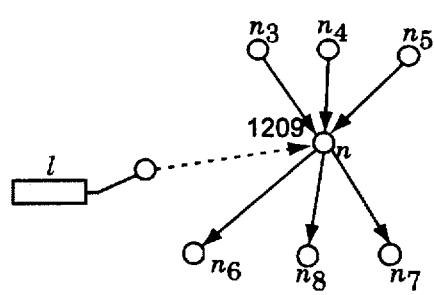
Figure 12(a)  Figure 12(b)
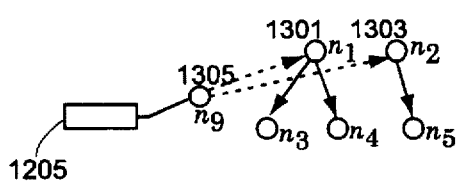 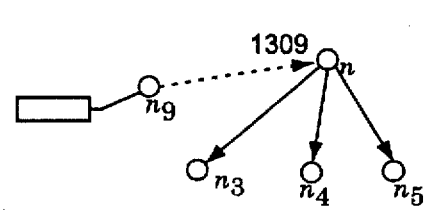
Figure 13(a)  Figure 13(b)
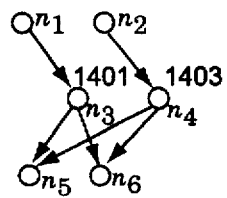 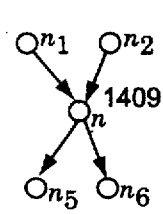
Figure 14(a)  Figure 14(b)
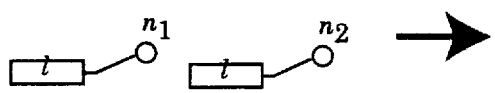 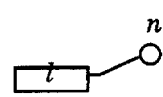
Figure 15(a)  Figure 15(b)

ASSOCIATIVE SEARCH METHOD FOR HETEROGENEOUS DATABASES WITH AN INTEGRATION MECHANISM CONFIGURED TO COMBINE SCHEMA-FREE DATA MODELS SUCH AS A HYPERBASE

MICROFICHE APPENDIX

A 68-page microfiche appendix consisting of one sheet and 57 frames microfiche is submitted as part of this application and incorporated herein.

The computer programs in the microfiche appendix are copyright DTL Data Technologies Ltd.

COPYRIGHTED MATERIAL

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

A. Field of the Invention

The field of the present invention is searching heterogeneous database systems and other systems for maintaining information in computers.

B. Some Definitions

The present invention deals with maintaining information, where information is anything that can be displayed to and that is comprehensible to humans and maintaining information is carrying out on a computer the necessary processes for storing, retrieving, and manipulating information. In particular, the present invention deals with retrieving information.

The present invention is applicable to all information, including textual and pictorial information. Textual information is data that can be spoken. Such data is stored in words, where a word is a list of characters. While embodiments of the present invention are described for textual information, extension to other types of information would be apparent to one skilled in the art.

Textual data can be either natural language text, consisting of words that are arranged in sentences with natural grammar rules, or formatted data text (also called row data text), consisting of words that are arranged in data structures such as tables, trees, sets of tables, lists of records, etc.

The art of databases deals with all aspects of maintaining such formatted data, including storage on disks, concurrency control, etc. The method of present invention involves searching information, and deals with the structural aspects of databases: the methods of (logically) representing information using computers, defining a query on databases, and displaying information.

A data-model is a generic data structure such as a table. For example, a relational data model is a set of tables, where a table is a set of rows, each with the same number of columns, all rows in a particular column sharing the same attribute. Each table typically is "a file", each row of a table is "a record of the file" each column in a row is a "field of a record" and each column having its particular attributes—"the attributes of the field."

A schema, defined with reference to a particular data model, is an instance of the particular data model, with parameters provided to the data model and words associated to the data model and its attributes. For example, a schema can be a table defined to have some fixed number of columns, a table name, and the attributes of the columns. For example, FIG. 3 shows a relational model consisting of two tables, EMPLOYEES and SALARIES. The schema for this relational model is as follows. The first table 301 is called EMPLOYEES and has two columns, the first column 303 is called ID and the other column 305 is called NAME. That is, the first column has the attribute 307 ID and the second has attribute 309 NAME. Each row (or record) of the table consists of a number for an employee (in the ID column) and the employee's name (in the NAME column). The second table 311 is called SALARIES and has three columns, having attributes ID, 1993 and 1994 denoted in FIG. 3 by 313, 315, and 317, respectively. Each record of SALARIES consists of a number for an employee (in the ID column), that employee's salary for 1993 (in the 1993 column) and that employee's salary for 1994 (in the 1994 column).

A database instance is an instance of a schema with the schema's parameters set. For example, if the schema is a table defined to have some fixed number of columns, a table name, with each of the columns having some attributes, then the instance would have a particular number of rows (or records) and the table's elements would have words associated to them. For the above schema for the relational model consisting of the tables EMPLOYEES and SALARIES, FIG. 3 shows the database with EMPLOYEES having two rows (or records), the first 319 having ID 001 and NAME John Smith and the second 321 having ID 002 and NAME Mary Lu, and SALARIES having one row 323 having ID 001, 1993 $73,000 and 1994 $80,000. This database is referred to below as PERSONNEL.

A query is a function, that is, a mapping, from a particular database into a substructure of the database. That substructure is called the answer of the query. The answer has particular parameters (words) that may be both from the schema of the database and from the data itself. Thus an answer can be viewed as an instance of a data structure.

For example, the following defines a query on PERSONNEL: select ID and 1993 from SALARIES where ID=001

This would provide an answer consisting of a table with two columns having attributes ID and 1993, respectively. These are from the attributes of the schema of PERSONNEL. The answer table would have one row consisting of 001 in column ID and $73,000 in column 1993. The contents of the row are from the data of database PERSONNEL.

In this specification, a note refers to a list of lines of words. Thus, an unstructured (except for lines) block of text is a note.

A grid is a structure which can store grid-like items of information, for example, a spreadsheet. A grid can thus be thought of as a table where both the columns and rows have attributes (i.e., names). This is slightly different from a table in a relational database, where only columns have attributes or names, and each row is a record.

A thesaurus is a set of phrases, where each phrase is a set of words. The phrases in a thesaurus entry typically each have similar meaning. In most cases, the phrases will consist of one word only, in which case a thesaurus is a list of words that have similar meaning.

A stem is similar to a thesaurus in that it consists of a set of words. In this case, the words are all morphological variants of the same root. For example, a stem might contain the words salaries and salary.

A grouped structure is a set of some of the above structures, with a name given to the set of structures to indicate that the set's component structures are all grouped together under that name.

An associative search is a query that takes a set of words (a phrase) as input and determines output which consists of a set of answers, sorted by relevance, where each answer is as defined above; an answer can be viewed as a set of phrases from the database or databases being searched.

The method of the present invention involves carrying out an associative search simultaneously on several heterogeneous databases. That is, on data which may be spread over several different database management systems. These systems may be incompatible with each other, use different data structures, and have their own different query languages. These systems might include relational data, notes, thesauri, stems, and/or grouped structures.

The method of the present invention is not limited to the data structures defined above, and may by extended easily to include other types of structures. How to carry out such an extension would be clear to one in the art from the present specification.

C. Description and Shortcomings of Prior Art Methods

The present invention describes a method for performing associative searches of several heterogeneous databases. The method overcomes many of the shortcomings of the prior art methods for searching heterogeneous databases. Some of the shortcomings include: the need for programming and database know-how, the need for database structure and data formatting, the need for common representations to enable integrating data from different databases, the difficulty in performing a "fuzzy" search and the difficulty in using ambiguous data.

Need for programming and database know-how

Typically, to perform a successful query on a database, one needs to have programming skills. To perform a query, a conceptual description of the query, for example, the query request expressed in everyday language, needs to be translated into a list of instructions for the computer to carry out the request. The conversion is typically not unique, and requires specific knowledge about the database and some know-how. Typically, the person carrying out the request needs to be a computer programmer. The cost of any query is thus high.

As an example, in the case of relational databases, one needs to know which files exist, what the files' names are, and what the fields and their corresponding attributes are for each file. In addition, one needs to be familiar with the concepts of selecting records from a table, joining two tables and projecting fields. Finally, one needs to be familiar with a query language such as SQL or some other relational query system.

Previous attempts at overcoming the programming know-how barrier to using databases include systems that help a user navigate through the schema to create a query, say an SQL query. This navigation process takes time, and still requires the user to understand the concepts of relational databases and the operations one can perform on them.

The present invention uses a data-model with no schema. Hence, a user does not need to know attributes (such as fields) to distinguish these from data values.

The present invention uses a querying syntax which is just a list of words, so one does not need to "learn" how to perform a query.

The present invention does not require the user to provide the search data path; the path is determined by the method of the present invention as a part of the search process. Thus a user need not be familiar with the concepts of database structure. Similarly, the user need have no knowledge of "navigation" or "manipulation" operators.

Need for database structure and data formatting

In order for one to derive the benefits of having data in a database, such as computerized searching, updating, etc., incoming data needs to be stored in a database. This requires designing the database schema, attributes and associated data representation formats, and then converting incoming data to this format. Thus, in prior art methods, a database system requires a comprehensive design phase before any data can be entered. In addition, before or during data entry, particular data words that represent particular situations need to be chosen. For example, one needs to decide whether "IBM," "I.B.M." or "International Business Machines" should be entered for the corporation International Business Machines, Inc. in, say, a field called COMPANY. If one chooses "I.B.M.," then "IBM" cannot be entered. Similarly, for EMPLOYEE CODE, one may choose to use numbers, and then one needs to enter something like "57" and not "temporary."

Such a database system is not flexible, and cannot accept data with new formats without requiring a redesign phase.

For example, with relational databases, data files should be determined, each file's fields should be determined, and the range of valid values for each field needs to be determined before any data entry can take place.

Prior art methods of overcoming the formatting requirements include not storing the data in a database, but storing it as text in some text reservoir. Text search operations such as word processor "find" or more complex operations involving logical operations such as "and," "or" and "and not" are used to locate data. These may be carried out by non-database professionals. The drawback is that all the advantages of keeping data in a database, such as easy sort, updating, etc. are gone. An alternate prior art method is to have text added to formatted record as a "memo." That is, to store data that does not comply with the current schema. The drawback is that such data can not be retrieved via the database query language such as SQL.

Data in the method of the present invention does not have formats so that no work needs to be carried out prior to data-entry. In addition, in the method of the present invention, some types of formatting can be carried out after the data is stored. For example, the method of the present invention would allow connecting "IBM" to "I.B.M." by adding more associations after data entry.

The need for common representation in different databases

With prior art methods, if data from different databases is to be integrated, the data in these databases needs to have common representation so that existing querying facilities will be able to work with the integrated data. For example, common representation to words need to be designed. One needs to be consistent, e.g., choose "I.B.M." rather than "IBM" or "International Business Machines," even though these three representations represent the same entity, a famous corporation. Similarly, one needs to use "employee" not "worker" and one needs to use "Windows 4.0" not "Chicago" and "Windows 95" even though these are known to represent the same entity, an operating system.

Similarly, one needs to use common data structures in the different databases, or alternatively, conversion needs to be carried out.

Thus, with prior art methods, data integration is tedious work that typically requires programming. No query to the integrated data is possible until all this work is finished. Hence, data integration is a very expensive process using prior art methods.

Data in the method of the present invention does not have formats. Thus, integration of two or more databases using methods of the present invention is carried out automatically. Queries can immediately access data from the integrated file. There is no need to design ahead of time common representations of data words. Associations among words of the same concept can be included at any time and at any place. For example, one can connect "I.B.M.," "IBM" and "International Business Machines," and one can connect "Windows 4.0" "Chicago" and "Windows 95."

Difficulty in performing searches amongst semantically associated concepts

Often, when carrying out a search, one would like to also search for associated concepts. That is, one does not only wish to find exact matches, but conceptually close matches. There are no standard tools available in the prior art. Implementing a fuzzy search using methods of the prior art typically requires programming; since the result of carrying out a fuzzy search with such methods is a large number of database requests, poor performance may result.

In the method of the present invention, fuzzy or associative searches are inherently integrated. By making associations among "neighbor" words and phrases, fuzzy (associative) search capability is immediately available.

Difficulty in using imprecise and ambiguous data

Often it is required to enter data to a database that can be interpreted in many ways. There are no standard ways or tools to perform such a function in prior art methods. Using prior art methods inherently requires the design of data structures that can include multiple values. All queries then need to be written with this data structure in mind. Thus, with prior art data models, including facility for ambiguous data requires programming and system complexity, and the resulting queries may suffer from slow performance.

In the method of the present invention, ambiguous data searches is inherently integrated. By making associations between words and all possible interpretations.

Prior-art methods do not combine all features

Bright, Hurson and Pakzad have developed a Summary Schemas Model (SSM) in M. W. Bright, A. R. Hurson and S. Pakzad, "Automatic resolution of semantic heterogeneity in multidatabases," ACM Transactions on Database Systems, vol. 19, no. 2, pp. 212–253, 1994. The SSM of Bright et al. is aimed at providing a user intuitive access by allowing a user to perform "imprecise queries." This is achieved by integrating relational databases with a taxonomy. A Taxonomy contains information traditionally found in dictionaries and thesauri. Unlike the method of the present invention, which allows combining a taxonomy with notes, grids, tables, and all forms of data, the SSM method allows combining only a taxonomy with relational databases. Furthermore, the SSM method integrates the taxonomy only with the column names of the schema, not with all the data (values etc.) in the database. Furthermore, the query language in the SSM method still is SQL-like, so that one still needs to know the schema (what files and what kind of columns are in the databases).

Poulovassilis and Levene have developed a nested-graph model in: A. Poulovassilis and M. Levene, "A nested-graph model for the representation and manipulation of complex objects," ACM Transaction on Information Systems, vol. 12, no. 1., pp. 35–68, 1994. Poulovassilis and Levene, however, do not solve the problem of searching in heterogeneous databases because they do not provide a method of converting various data formats such as relational databases, notes, thesauri, grids, etc., into the nested-graph model. Furthermore, a search language with a logic format is used to search a nested-graph so that a user needs to have some computer-science know-how to perform a search. Moreover, the search language requires knowledge about how data is represented; that is, the schema. Finally, the nested-graph model differs from the hyperbase of the present invention in that nested graphs have no equivalence edges and do not support typed nodes.

Gyssens et al. have defined a grammar model in M. Gyssens, J. Paradaens and D. Van Gucht: "A grammar-based approach towards unifying hierarchical data models," Proceedings, ACM Conference on Data Modeling (SIGMOD 89), pp. 263–272, 1989. The Gyssens et al. approach, however, uses a simple tree structure, whereas the present invention uses a "generalized" graph called a hyperbase. Use of a hyperbase allows one to convert many different structures, whereas the Gyssens et al. approach is limited to representing hierarchical structures. Furthermore, queries in the Gyssens et al. approach use a language requiring knowledge of the structure, whereas the associative search method of the present invention requires no knowledge of the structure of the hyperbase which contains the information.

II. SUMMARY OF THE INVENTION

A method of performing an associative search on a set of heterogeneous databases is described. In one embodiment, the method is implemented on a general purpose computer. The method comprises converting each database of the set of databases into a schema-free structure called a hyperbase. A hyperbase is a "generalized" graph in that it has typed nodes, more than one kind of node, more than one kind of edge, and labels, where the labels are the elementary items of information, text words in one embodiment. The hyperbases corresponding to each database of the set of databases are combined into a single combined hyperbase, and that single hyperbase is normalized into a single normalized hyperbase. It is this single hyperbase which is searched.

An associative search involves providing a set of input words. The method of the present invention determines an answer, which is that sub-hyperbase of the hyperbase to be searched which has minimum "distance" according to a criterion. In one embodiment, a list of sub-hyperbases is returned to the user, the list ordered according to distance.

Several distance criteria may be used in the invention. In one preferred embodiment, the number of input words that is in the hyperbase is maximized. In another, the number of edges in the sub-hyperbase is used. In another embodiment, a partial node method is used.

Once an answer is determined, the answer is displayed to the user. In one embodiment, the list of words in the sub-hyperbase is displayed. In another, the sub-hyperbase is graphically displayed.

III. BRIEF DESCRIPTION OF THE DRAWINGS

FIG. 9(a) shows a grid.

FIG. 9(b) shows the unnormalized hyperbase of the grid of FIG. 9(a).

FIG. 9(c) shows the hyperbase of FIG. 9(b) after normalization.

FIG. 11 illustrates normalizing a node that is not a leaf and that has a label.

FIG. 12 illustrates normalizing a group of nodes that has the same label associated with each node in the group.

FIG. 13 illustrates normalizing a group of nodes, each of which is referenced by the same reference node.

FIG. 14 illustrates normalizing a group of nodes, each node of which has no label, is not a referred node, and has the same children.

FIG. 15 illustrates normalizing a group of labels which are the same.

IV. DESCRIPTION OF THE PREFERRED EMBODIMENT

A method for carrying out an associative search of heterogeneous databases is described. In the following description, numerous specific details are set forth in detail in order to provide a more thorough understanding of the present invention. It will be apparent, however, to one skilled in the art, that the present invention may be practiced without these specific details. In other instances, well known features have not been described in detail so as not to obscure the present invention.

A. Implementation on a Computer System

Figures 2, 3:
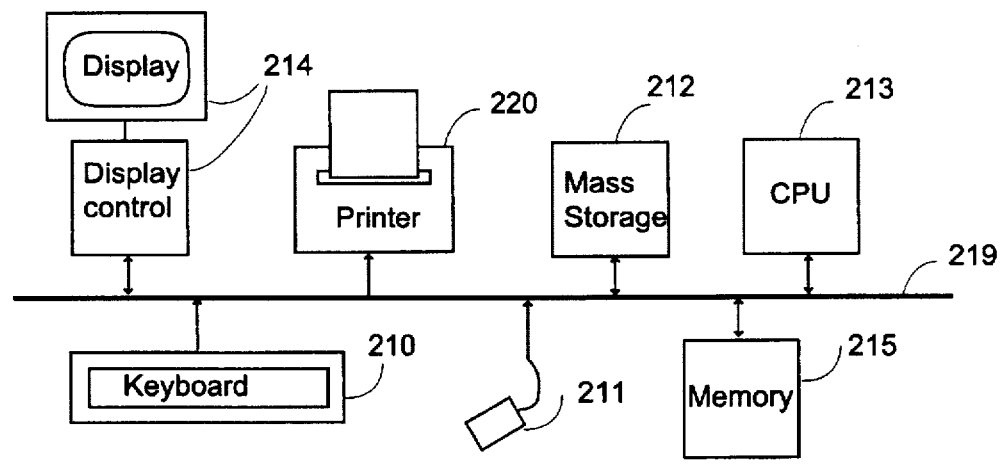
FIG. 2 shows an example embodiment of a computer system on which the invention may be implemented.
FIG. 3 shows the database referred to herein as PERSONNEL.

The present invention may be implemented on any conventional or general purpose computer system or computer based data system. An example of one embodiment of a computer system for implementing this invention is illustrated in FIG. 2. A keyboard 210 and mouse 211 are coupled to a bi-directional system bus 219. The keyboard and mouse are for introducing user input to the computer system and communicating that user input to CPU 213. The computer system of FIG. 2 also includes a video memory and display 214, main memory 215 and mass storage 212, all coupled to bi-directional system bus 219 along with keyboard 210, mouse 211 and CPU 213. The mass storage 212 may include both fixed and removable media, such as magnetic, optical or magnetic optical storage systems or any other available mass storage technology. The mass storage may be shared on a network, or it may be dedicated mass storage.

In one embodiment of this invention, the CPU 213 is a 32-bit or 64-bit microprocessor. However, any other suitable microprocessor or microcomputer may be utilized. Main memory 215 is comprised of dynamic random access memory (DRAM) and in the preferred embodiment of this invention, comprises at least 8 megabytes of memory. More or less memory, or a different type of memory may be used without departing from the scope of this invention. Video memory and display 214 consists of a cathode ray tube (CRT) raster monitor connected to a dual-ported video random access memory, and which, in this implementation, consists of 2 megabytes of memory. However, more or less video memory may be provided as well.

The computer system is also coupled to a printer 220, which may be a laser printer and may be connected via a network.

The computer system described above is for purposes of example only. The present invention may be implemented in any type of computer system processing environment.

B. The Structure of a Hyperbase

The method of the invention requires converting data to be in a particular structure that has no schema. As a first step, all data, whether in relational databases, tables, text notes, lists of words (thesauri and stems), grids, grouped structures, etc., are converted to this common structure. The method next queries the structure. The preferred embodiment uses a structure, which I, the inventor, have called a hyperbase in this specification. The invention, however, is not limited to using a hyperbase. Other schema-free data models that are similar may be used without deviating from the scope of the invention, and any modifications needled to the method of the present invention to use these alternate data models will be clear to one in the art. For example, the present invention may be embodied using the grammar model of Gyssens et al. in M. Gyssens, J. Paradaens and D. Van Gucht, "A grammar-based approach towards unifying hierarchical data models," Proceedings, ACM Conference on Data Modeling (SIGMOD 89), pp. 263–272, 1989. However, as noted above, the Gyssens et al. model is limited to hierarchical structures. In addition, use of such a model may require queries to have knowledge about the structure, whereas using the hyperbase model does not require knowledge of the structure.

The following nomenclature is used to describe the hyperbase structure. The elements of hyperbase are called labels and nodes. A label is a piece of information, for example a character, a textual word, a number, a picture, a voice recording, etc. Labels are the elements understood by the user and other external systems. Labels can be compared to each other to test for equality. In this description of the method of the invention, labels will be words, although the invention is not limited to such labels. A node contains no information other than its relation to other hyperbase elements: a label or one or more other nodes. A label cannot exist by itself; it is always associated with a node. The word object will sometimes be used as a synonym for node. The relation of a node to one or more other nodes is indicated diagrammatically by directed edges. There are both simple directed edges and equivalence directed edges. A simple directed edge connects from a node called the parent (of the edge) to a node called the child (of the edge). When several edges emanate from one parent, these edges are ordered. That is, when several nodes are the children of a single parent, their order is important. On the other hand, when one node is the child of several parents, there no ordering of the parents. A leaf node is a node with no children. A root note is a node with no parents. An equivalence directed edge is used to indicate the equivalence of two nodes, the reference and the referenced node; the direction is from the reference node to the referenced node.

A node may be marked as a display node, and a display node may further be marked as a fact. A display node is a type of node that can be displayed to a user, for example, a row in a table, a note, etc. A node also has a type from an extensible list of types, including word, string, field-name, record, cell, note, file, morphological stem, thesaurus-entry, etc.

The elements of a hyperbase follow a set of rules as follows. A node can have either a label or one equivalence edge directed to it, or no label and no equivalence edge. Every leaf node has a label associated with it. A hyperbase cannot have any loops of equivalence edges or of simple edges. Finally, on every route of simple (non-equivalence) edges in the same direction from a leaf to a root, there is at least one display node, where a root is a node that has no parents.

Figure 1:
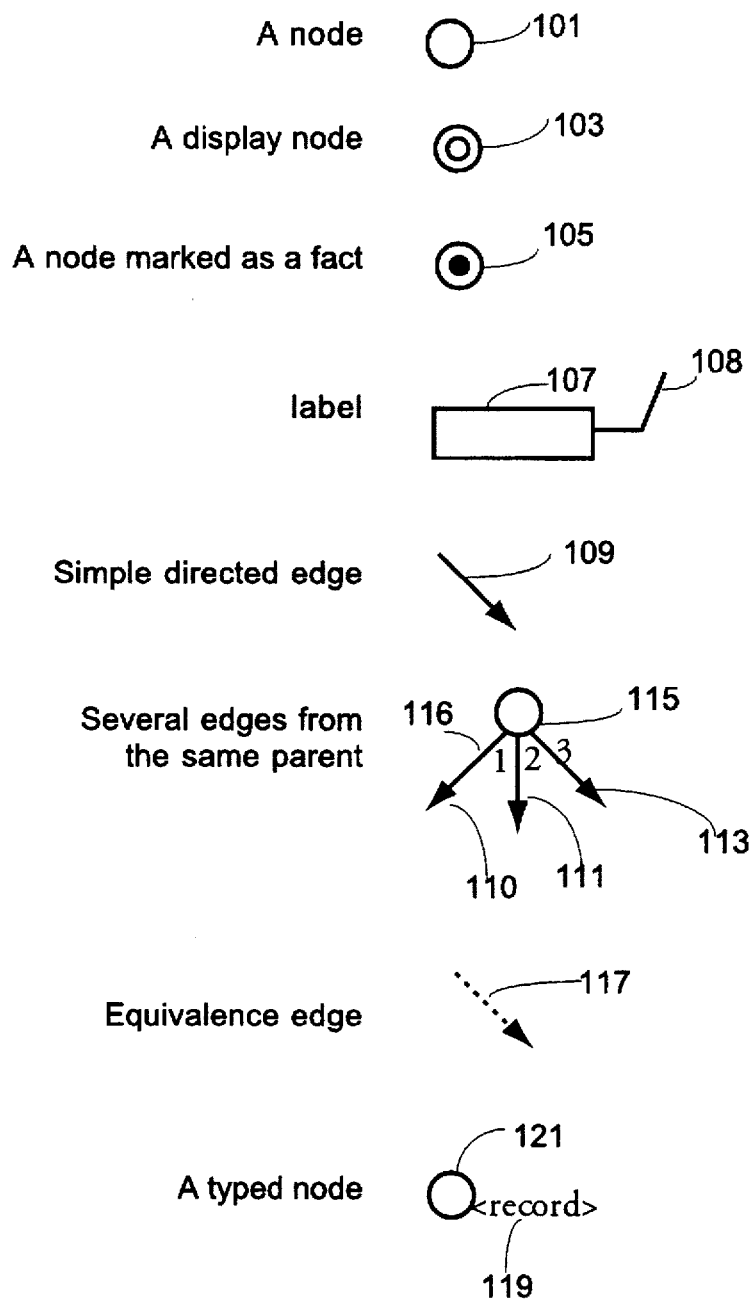
FIG. 1 illustrates the symbols used in this specification for drawing a hyperbase.

FIG. 1 illustrates the symbols used in this specification for drawing a hyperbase. A node 101 is indicated by a simple small hollow circle. A display node 103 is indicated by a smaller untilled circle inside the main node circle. A fact 105 is indicated by that smaller circle being filled in. A label 107 is indicated by a small rectangle with a line 108 connecting that rectangle to the node associated with the fact. A simple edge 109 is indicated by an arrow from the parent node to the child node. The ordering on an edge (shown as a simple directed edge 110) when there are more edges (shown as 111 and 113) from the same parent 115 is indicate by an integer 116 on the edge. An equivalence edge 117 is indicated by a broken-line arrow. When a node is typed, the type 119 is indicated alongside the typed node 121.

A hyperbase is said to be in Normal Form 1 if: (a) no two labels are the same; (b) no two nodes have the same label; (c) no two nodes have the same reference; and (d) no two unlabeled, unreferenced nodes have the same list of children. A hyperbase is said to be in Normal Form 2 if it is in Normal Form 1 and a label is associated only with a leaf. In the preferred embodiment, data is converted to a hyperbase of Normal Form 1 and 2, although the invention may be made operative with hyperbase structures that are not in these forms as would be clear to one in the art.

FIG. 9(c) shows a hyperbase in Normal Form 2. Node 915 is a reference node and hence has a label 917. Referenced node 911 has four children: display nodes 921, 922, 923 and 924. Display nodes 921, 922, 923 and 924 are marked as facts. Leaves 931, 932, 933, 934, 935, 936, 937 and 938 all have labels.

A hyperbase as defined in the invention can be regarded as a graph with different types of nodes and different types of edges, some of the nodes having labels. Some concepts about graphs which would be familiar to those in the art are applicable also to hyperbases. A walk from a node $n_1$ to a node $n_2$ is a finite alternating sequence of adjacent nodes and edges starting with node $n_1$ and ending with node $n_2$. A path from a node $n_1$ to a node $n_2$ is a walk from $n_1$ to $n_2$ that does not contain a repeated edge. A simple path from a node $n_1$ to a node $n_2$ is a path from $n_1$ to $n_2$ that does not contain a repeated node. A loop is a path that starts and ends in the same node. Two nodes $n_1$ and $n_2$ are connected if and only if there is a walk from $n_1$ to $n_2$. A hyperbase is connected if and only if, given any two nodes $n_1$ and $n_2$, there is a walk from $n_1$ to $n_2$.

C. Conversion to hyperbases

The first step in the method of the present invention is to convert to one or more hyperbases the various databases, notes, grids and/or thesauri groups that make up the heterogeneous databases to be searched. Conversion to a hyperbase of each of these types will now be described in detail. It will be clear to one on the art how to apply the general principles of the below conversion methods to convert other data structures not described below.

Conversion from a table to a hyperbase

The method of converting a table to a hyperbase according to one preferred embodiment will be described by reference to the flow chart of FIG. 5. In step 501, a node (denoted in FIG. 5 by tn) is created for the table name. Steps 503 through 509 are then carried out for each word in the table name. This is indicated by the loop checking of step 511. Thus, for each word in the table name, a node is created in step 503, the node denoted in the flow chart by wn. In step 505, a label (denoted wl) is created for the word. In step 507, this label is associated with the node wn. In step 509, an edge is created from the word node wn to the table-name node tn and given the order of this word in the table name. In step 511, it is determined whether or not there are more words in the table name. If yes, the steps 503 through 511 are repeated until the table-name has been processed. Next, a node (denoted by t) for the table is created in step 513 and an equivalence edge is created from tn to t in step 515. The column names and attributes are next processed in steps 517 through 529. For each column until there are no more columns, a node is created (denoted by cn) for the column's name in step 517. The words in the column name are then processed one by one until there are no more words. The processing is comprised of, for each word creating a node (denoted by wcn) for the word in step 519, creating a label (denoted by wcl) for the word in step 521, associating wcl to wcn in step 523 and, in step 525, creating an edge, in word order, from the word node wcn to the column name node cn. Step 527 checks if there are more words in the column name, and step 529 checks if there are more columns.

Once all the columns are processed, the rows are processed, starting with the first, one by one, until there are no more rows. For a particular row, a node is created in step 531, the node denoted by rm in the flow chart of FIG. 5. In step 533, an edge is created, in row order, from t to rm, and rm is marked in step 535 as a display and fact node. The values in the row are examined now one by one, in column order, starting with the first value. In step 537, a node (denoted by vcn) is created for this value. An edge from node rm to value node vcn is created in column order in step 539. An edge is now created in step 540 from value node vcn to the corresponding column name node cn. A node is now created in step 541 for the string of words for that value, the string denoted by vsn. An edge is now created in step 542 from value node vcn to the value string node vsn. The words in this string vsn are now processed one by one, starting with the first, until there are no more words. For each word, a node, denoted by wvcn in FIG. 5, is created in step 543. An edge from vsn to wvcn is created in step 544. A label (denoted by wvcl) for that word in step 545. In step 546, wvcl and wvcn are then associated. Steps 547, 549 and 551 check if there are more words to the value, more values in the row, and more rows, respectively. When all rows have been processed, the table has been converted to a hyperbase.

Referring to FIG. 3, conversion of the table 301 named EMPLOYEES will now be described according to the flow chart of FIG. 5. The table consists of the table name EMPLOYEES, the columns 303 and 305, where each column has a name (also called attribute), and rows, where each row has at each column location a list of words, called a value in this specification. In the example of FIG. 3, the second row 321 has value "Mary Lu" at column name NAME 309.

Figure 4A:
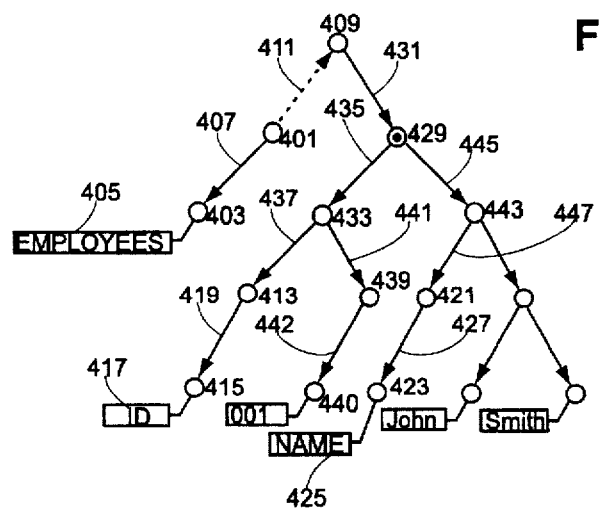
FIG. 4(a) shows a possible hyperbase representation of the first line of the table EMPLOYEES.
Figure 4B:
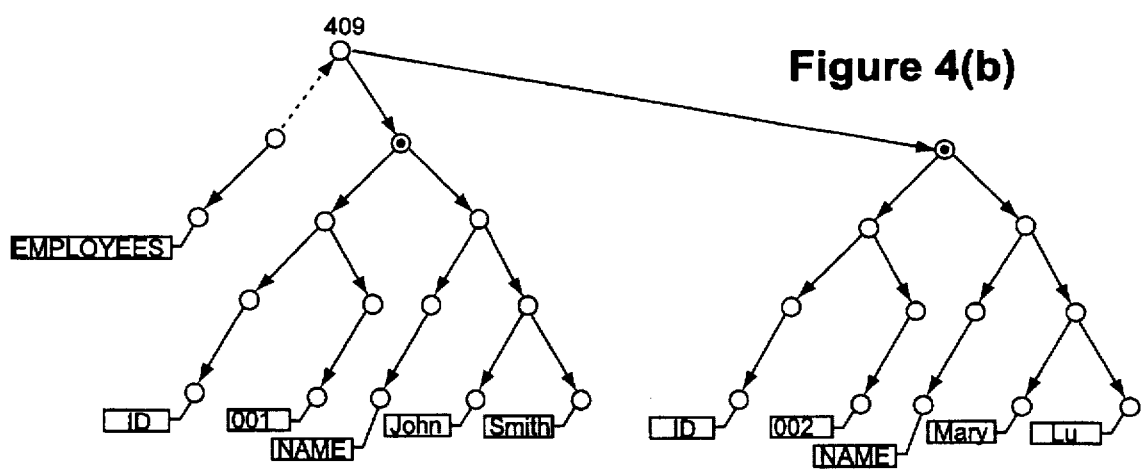
FIG. 4(b) shows a possible hyperbase representation of the first and second lines of the table EMPLOYEES.
Figure 5A:
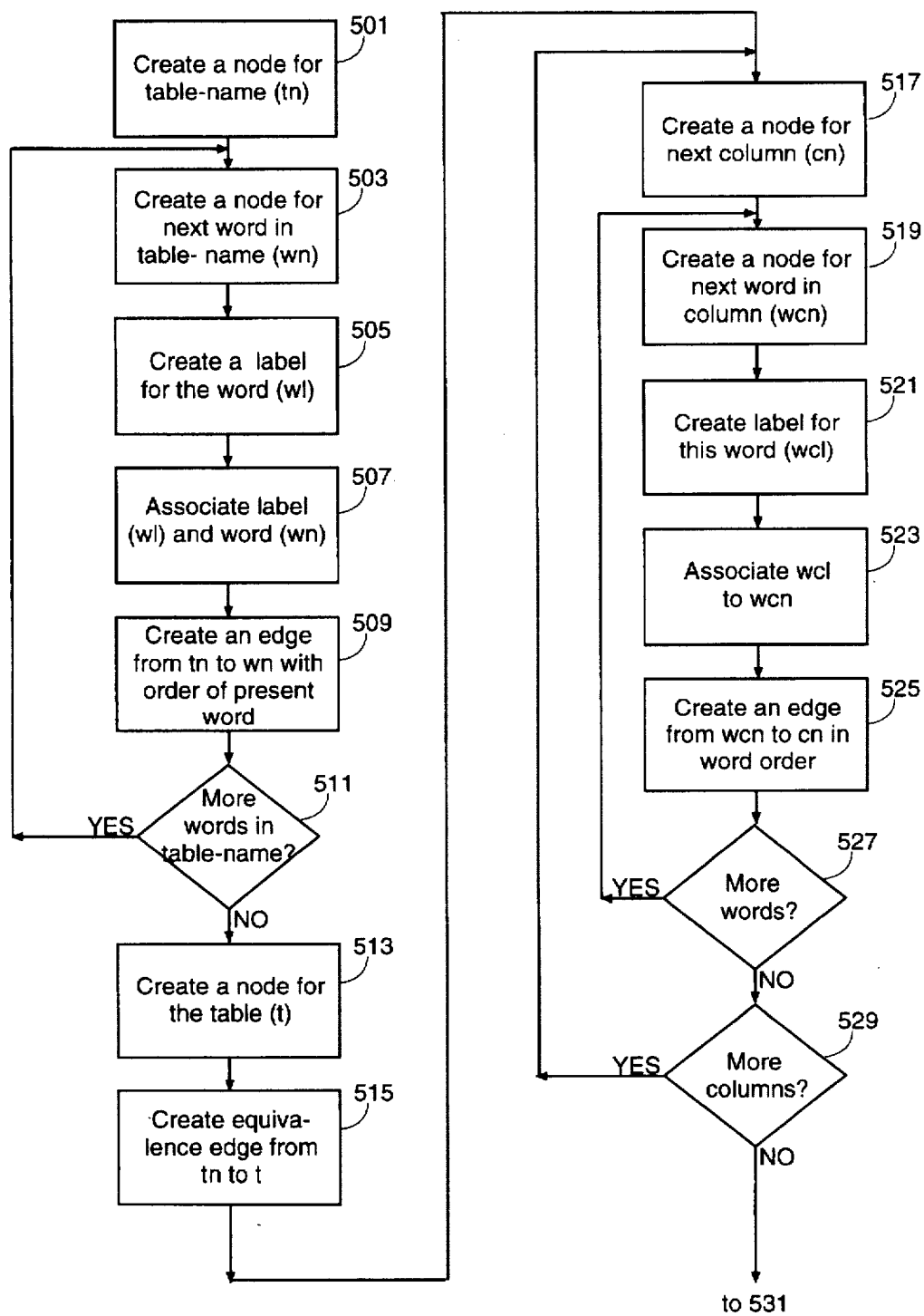
FIG. 5 (comprising FIGS. 5A and 5B) shows the flow chart for converting a table to a hyperbase.
Figure 5B:
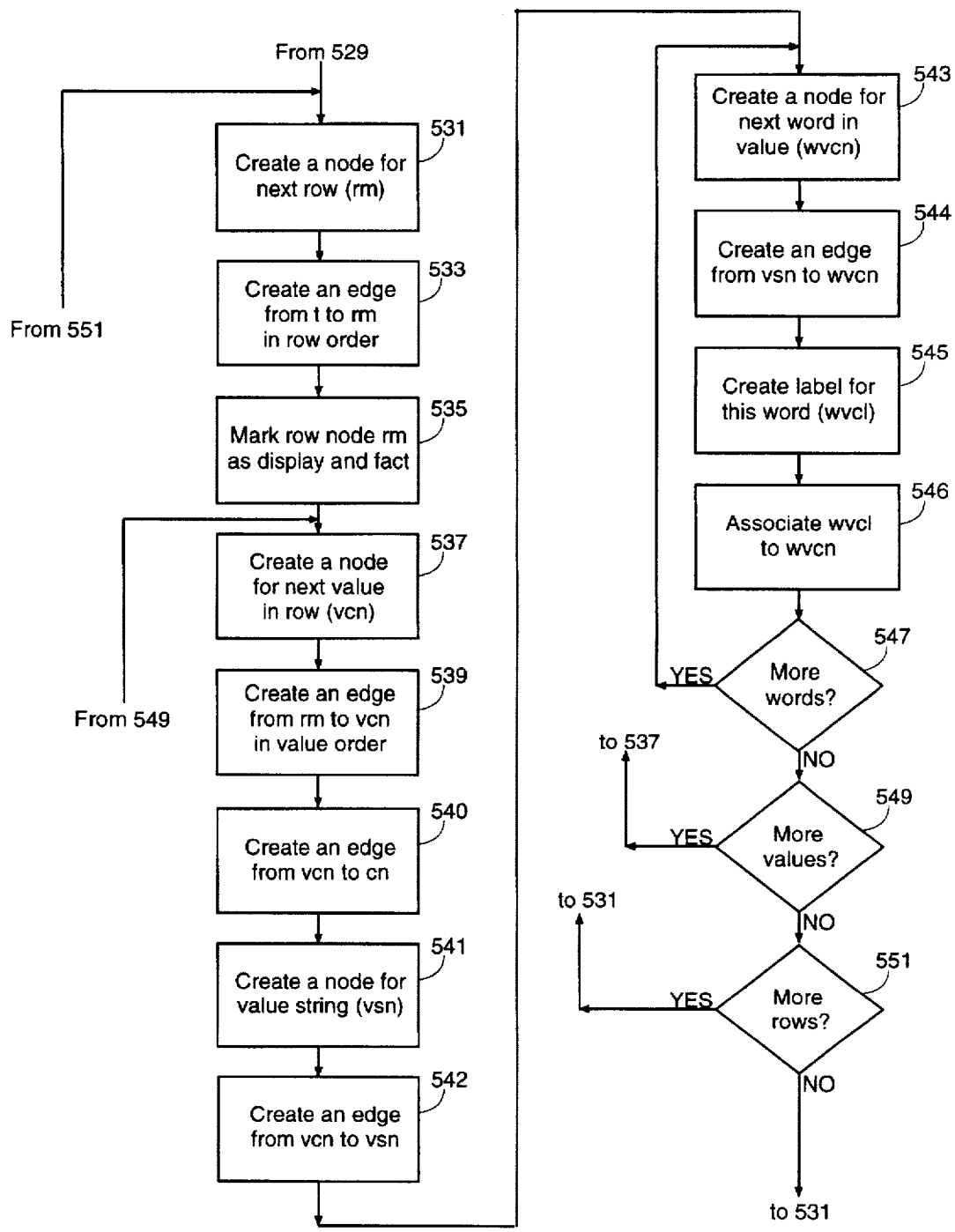

Conversion of EMPLOYEES using the method of the flow chart of FIG. 5 is illustrated in FIGS. 4(a) and 4(b). A node 401 is created for the table name in step 501. The first word of the table-name, EMPLOYEES has node 403 created in step 503. Label 405 containing "EMPLOYEES" is created in step 505 and associated with node 403 in step 507. Edge 407 is created from node 403 to 401 in step 509. Since there are no more words in the name, a node 409 is created for the table in step 513, and an equivalence edge 411 is created from table name 401 to table node 409. The column names are now processed column by column, in column order. The first column name 307 is processed by creating a node 413 for it at step 517. The node 415 for the word ID is now created at step 519. The label "ID" 417 is created and associated with node 415 in steps 521 and 523. The edge 419 is created at step 525. The next column name is now placed in the hyperbase by carrying out steps 517 through 525 for the second column to create node 421, node 423 and associated label 425 and edge 427. Since there are no more columns, the method proceeds to step 531 in which node 429 for the first row is created. Edge 431 is created from t to this row node 429 in step 533, and node 429 is marked as display and a fact in step 535. The values (corresponding to columns) are now processed, one by one. The node 433 for the first value is created in step 537 and edges 435 to this node 433 and 437 from this node are created in steps 539 and 540, respectively. This value string node 439 for this value is next created in step 541, and an edge 441 is created from node 433 to the string node 439. The string has only one word. A node 440 is created for this word in step 543, and an edge, 442 from string node 439 to node 440 is created in step 544.

The label 001 is then created and associated with word node 440 in steps 545 and 546. There are no more words for this value, so the process proceeds to step 537 via step 549 to process the next value in the row.

Node 443 is created in step 537 for this next value, then two edges, edge 445 from row node 429 to value node 433, and edge 447 from 433 to column node 421, are created in steps 539 and 540, respectively. The value string node and its edge from the value node are now created. Two words and associated labels and edges are then created for the value "John Smith".

Figure 4C:
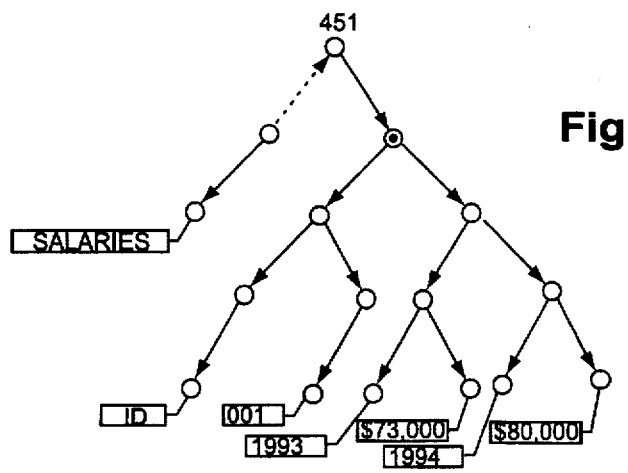
FIG. 4(c) shows a possible hyperbase representation of the table SALARIES.

At this stage, the hyperbase is as shown in FIG. 4(a). Repeating the process for the second row results in the complete hyperbase shown in FIG. 4(b). Similarly, converting the table SALARIES 311 of FIG. 3 results in the hyperbase 451 shown in FIG. 4(c).

Conversion from a note to a hyperbase

Figure 6:
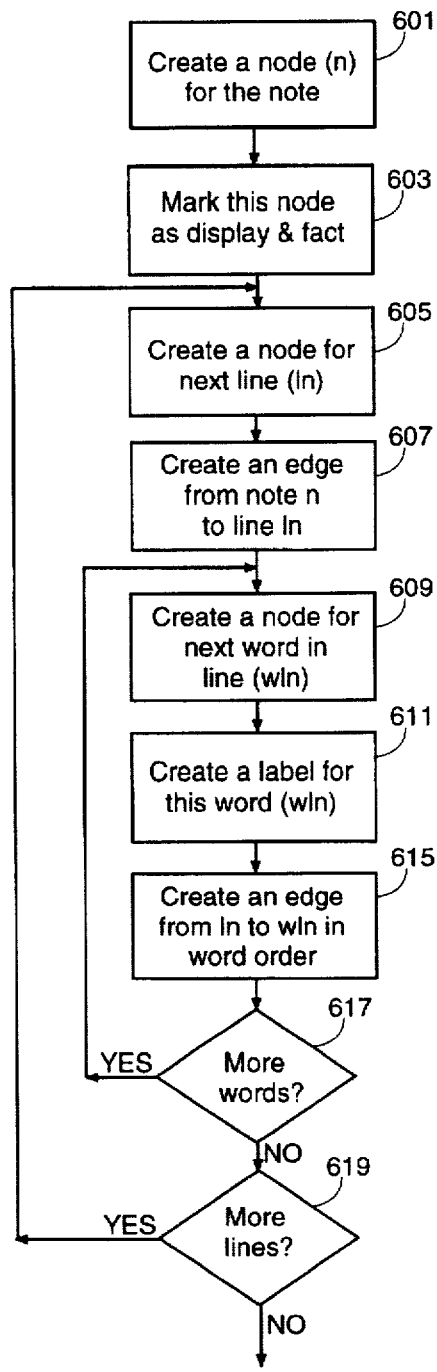
FIG. 6 shows the flow chart for converting a note to a hyperbase.

A note is a list of lines of words. In one preferred embodiment, the method for converting a note to a hyperbase is shown in the flowchart of FIG. 6. As example, the following note is considered:

John Smith 15 Sanchez Street San Francisco Calif. 94110.

Figure 7:
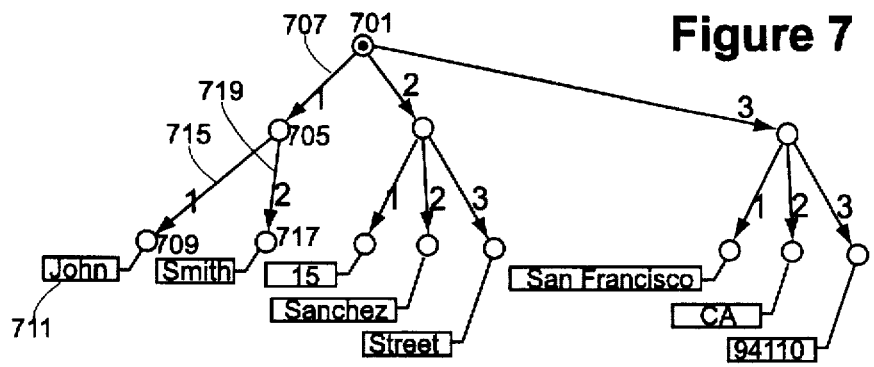
FIG. 7 shows the hyperbase of a note.

The result of carrying out the steps of the flowchart of FIG. 6 on this example note is shown in FIG. 7. In step 601, the node 701 for the note is created. This node is marked as a display node and a fact in step 603. The three lines of this note are now processed one line at a time. In step 605, a node 705 is created for the first line and an edge 707, ordered 1, is created from the note node 701 to the line node 705. The two words in this first line are now processed one word at a time.

For the first word, a node 709 is created in step 609, a label 711 is created in step 611, and the word label and word node are associated in step 613. An edge 715 is created (order 1 for the first word) from line node 705 to word node 709.

The above is repeated for the second word of the first line, and the steps are likewise repeated for each line until all three lines are processed, resulting in the complete hyperbase shown in FIG. 7.

Conversion from a thesaurus or a stem to a hyperbase.

A thesaurus is a set of words of similar meaning, and a stem is a list of words having the same root. The process for converting any set of words to a hyperbase uses that subset of the flowchart of FIG. 6 that processes a line (a list of words). According to one embodiment, the pseudocode for such conversion is 1. Create a node (t) for the set and mark this node as display.
2. For each word w in the set do:
3. Create a word-node (wn)
4. Create a label (wl) of this word
5. Associate wl to wn
6. Create an edge from t to wn.

Figure 8A:
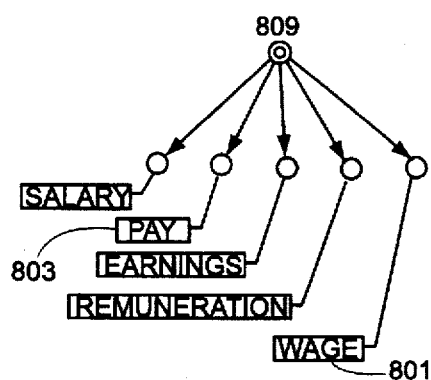
FIG. 8(a) shows the hyperbase of a thesaurus.
Figure 8B:
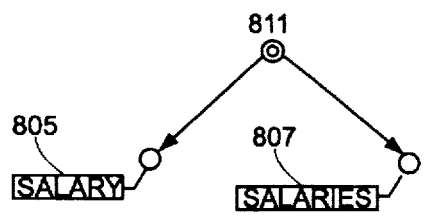
FIG. 8(b) shows the hyperbase of a stem.

As an example, FIG. 8(a) illustrates the hyperbase of the set of words {SALARY, PAY, EARNINGS, REMUNERATION, WAGE} which is a thesaurus. FIG. 8(b) illustrates the hyperbase for the set {SALARY, SALARIES} which is a stem.

Conversion from a grid to a hyperbase

A grid is a table where both columns and rows have names. A grid is used to store spreadsheets and other forms of tabular data.

FIG. 9(a) illustrates, as an example, a grid 901 called SALARY SPREADSHEET. Table 901 consists of two columns and two rows. The first column 903 has column name 001 and the second column 905 has column name 002. The first row 907 has row name 1993 and the second row 909 has row-name 1994.

The method for converting a grid to a hyperbase is an extension of the method shown in the flowchart of FIG. 5 for a database table. The modification is that for each row, one also creates a node for the row name and an edge from the row node to the row name node. The row nodes, like the column nodes of a simple table, also are marked as display and fact. Modifying the flowchart of FIG. 5 to achieve this would be clear to one in the art. FIG. 9(b) illustrates the hyperbase that results from converting the grid 901 of FIG. 9(a) according to such a modification of the flow chart of FIG. 5.

Conversion of a grouped structure to a hyperbase

A grouped structure is a set consisting of some of the above structures, with a name (a group-name) given to the set.

Figure 10:
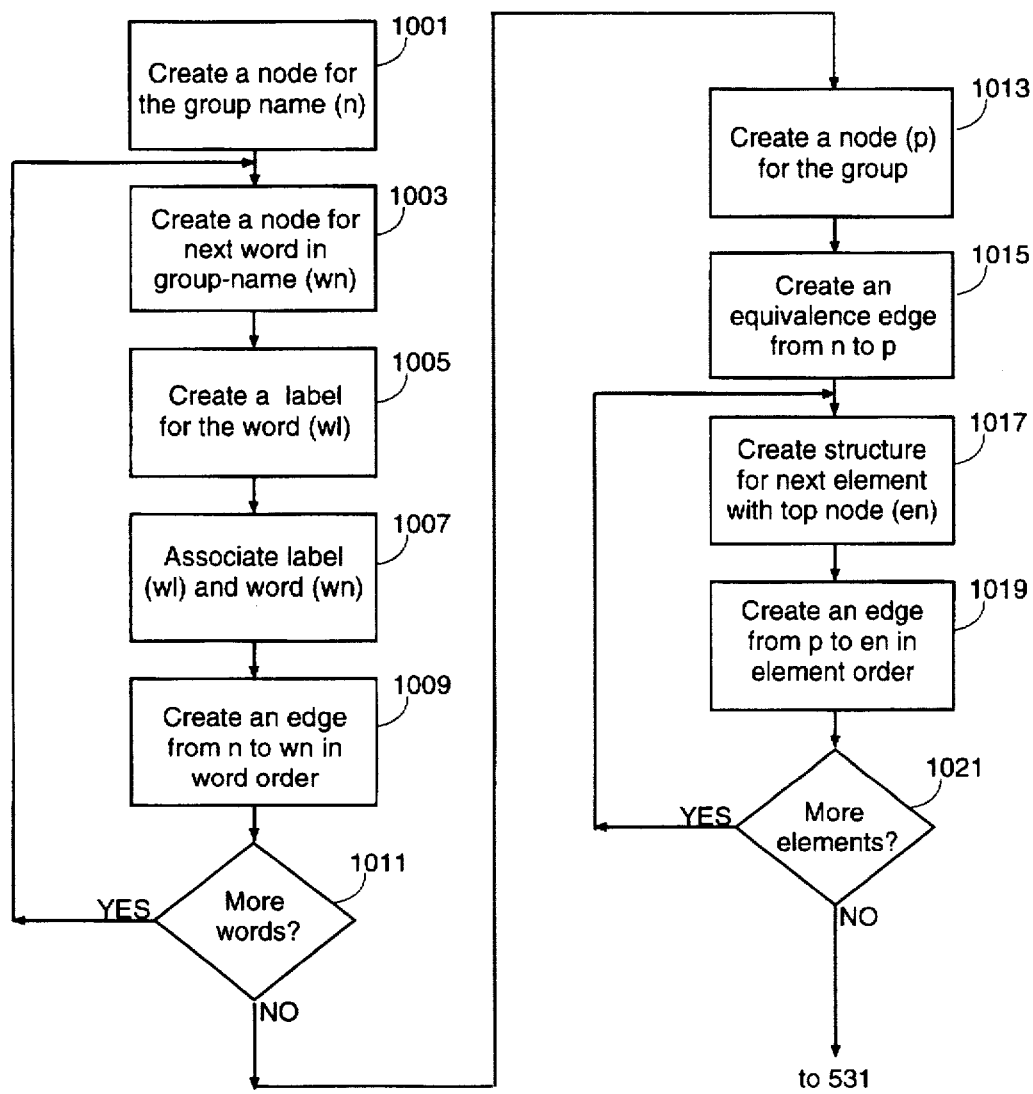
FIG. 10 shows the flow chart for converting a grouped structure to a hyperbase.

A method of converting a grouped structure according to the embodiment of the present invention is described by the flowchart of FIG. 10. Steps 1001 through 1015 create a sub-structure for the group node and the group-name in an analogous manner to how steps 501 through 515 in the flow chart of FIG. 5 create a sub-structure for the table node and table-name, respectively, for a table. The next step is to process each of the component elements in the group, element-by-element, in element order, starting with the first element. For each element, the structure for that element is created in step 1017, in accordance with the method of the present invention for that element as described above. In FIG. 10, the top node of the (sub) hyperbase of that node is denoted by en. In step 1019, an edge is created from the group node, denoted p in FIG. 10, to the element node en. Steps 1017 and 1019 are repeated until all elements are processed.

Extension of the conversion techniques to other structures

The above structures can be extended hierarchically. For example, a whole document can be represented as a hyperbase as follows: A sentence is a set of words. A paragraph is a set of sentences, etc. The conversion method for groups according to the present invention is applicable to such extensions as will be clear to one in the art.

Generalization

As would be clear to one in the art, many of the steps of the flowcharts of FIGS. 5, 6 and 10, can be combined into one step. It would also be clear to one in the art that alternate but functionally similar methods can be used to convert any of the above structures to a hyperbase.

D. Normalization and Integration

Normalization

Normalization is the process of converting a hyperbase to Normal Form 2. In the preferred embodiment of the present invention, all hyperbases are normalized. To normalize a hyperbase, one needs to deal with (a) any node that is not a leaf and that has a label associated with it; (b) any group of nodes that has the same label associated with each node in the group; (c) any group of nodes that has the same reference node referring to each node in the group; (d) any group of nodes where each node in the group has no label, is not a referred node, and has the same list of children; and (e) any labels that are the same.

According to one embodiment of the present invention, the following method is used for normalization of every node (denoted by n) that is not a leaf and that has a label (denoted by l) associated with it. The method comprises: creating a new node (denoted by nn); unassociating l from n; associating l to n; and creating an equivalence edge from nn to n. The process is illustrated in FIG. 11. In FIG. 11(a), node 1101 (denoted by n) is not a leaf and has label 1103 (denoted by l). Thus, in accordance with the method of the invention, a new node 1105, denoted by $n_2$ is created and an equivalence edge 1107 from $n_2$ to n also is created.

The following method is used for normalization of every group of nodes that has the same label associated with each node in the group. The group of nodes is replaced by a single node that has: (i) a list of children consisting of the concatenation of all the children of all the nodes in the group, and (ii) a set of parents consisting of the union of all the parents of all the nodes in the group. In addition, the new node is a reference to all the nodes that were referenced by any of the nodes in the group. The process is illustrated in FIG. 12(a), where nodes 1201 and 1203, denoted by $n_1$ and $n_2$, respectively, each have the same label denoted by l. According to the process, nodes $n_1$ and $n_2$ are replaced by node 1209, denoted by n in FIG. 12(b).

The method that is used for normalizing every group of nodes, each of which is referenced by the same reference node, is similar to the above method for nodes with the same label—the group of nodes is replaced by a single node that has: (i) a list of children consisting of the concatenation of all the children of all the nodes in the group; and (ii) a set of parents consisting of the union of all the parents of all the nodes in the group. In addition, the new node is a reference to all the nodes that were referenced by any of the nodes in the group. The process is illustrated in FIG. 13(a), where nodes 1301 and 1303, denoted by $n_1$ and $n_2$, respectively, each have the same reference node 1305. According to the process, nodes $n_1$ and $n_2$ are replaced by node 1309, denoted by n in FIG. 13(b).

The method for normalizing every group of nodes, each node of which has no label, is not a referred node, and has the same list of children, comprises: replacing the group of nodes by a single node that has: (i) a list of children consisting of the children of the nodes in the group, and (ii) a set of parents consisting of the logical union of all the parents of all the nodes in the group. In addition, the new node is the reference node to all the nodes that were referenced by any of the nodes in the group. The process is illustrated in FIG. 14(a), where nodes 1401 and 1403, denoted by $n_1$ and $n_2$, respectively, each have the same children, nodes 1405 and 1407, denoted by n5 and n6, respectively. According to the process, nodes $n_1$ and $n_2$ are replaced by node 1409, denoted by n in FIG. 14(b).

The method for normalizing every group of labels which are the same is to replace the labels by a single label, and associate that label with all the nodes that were associated by the labels in the group. The process is illustrated in FIG. 15(a), where nodes 1501 and 1503, denoted by $n_1$ and $n_2$, respectively, each have the a label 1. According to the process, the labels are replaced by a single label that is associated with both node n as illustrated in FIG. 15(b).

To illustrate normalization by example, the unnormalized hyperbase of FIG. 9(b) becomes the hyperbase of FIG. 9(c) after normalizing according to the preferred embodiment of the present invention.

Integration

Integration is the process of combining several hyperbases to generate a single hyperbase. In the method of the present invention, once all the heterogeneous databases to be searched have been converted into hyperbases, all the hyperbases are integrated into a single hyperbase. This step may be carried out before normalization or after normalization. However, it should be noted that integrating several normalized hyperbases does not guarantee a normalized combined hyperbase, so that normalization always should be performed after integration. In the preferred embodiment of the present invention, integration is carried out first. Normalization is then carried on the resultant hyperbase to produce a hyperbase of Normal Form 2 to be searched.

Figure 16:
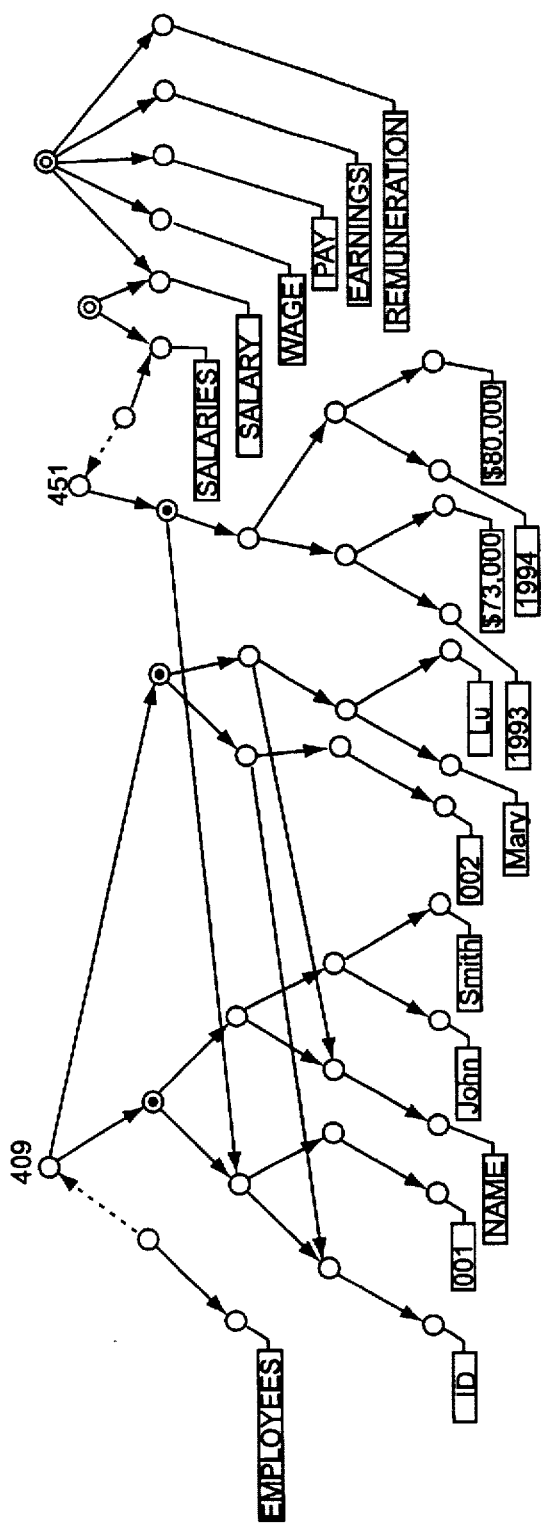
FIG. 16 shows the hyperbase resulting from combining the hyperbases of the tables of FIG. 3 with the hyperbases of FIG. 8 of a thesaurus and stem, the combining according to one embodiment of the method of the present invention.

To combine a number of hyperbases, one takes the logical union of all the hyperbases to form a single hyperbase. That is, the set of nodes of the resultant hyperbase is the union of the nodes of the original hyperbases, and the set of edges of the resultant hyperbase is the union of the edges of the original hyperbases. This process will be illustrated by combining the following four hyperbases: the hyperbase 409 shown in FIG. 4(b) of the table EMPLOYEES 301 of FIG. 3; the hyperbase 451 shown in FIG. 4(c) of the table SALARIES 311 of FIG. 3; the hyperbase 809 of a thesaurus shown in FIG. 8(a); and the hyperbase 811 of a stem shown in FIG. 8(b). The result of combining these hyperbases then normalizing the result is the hyperbase shown in FIG. 16.

E. Hyperbase Query: Carrying Out the Associative Search

According to the present invention, a query is an ordered list of words. Using the terminology of this specification, to carry out a query on a set of heterogeneous databases, one first determines the combined normalized hyperbase of all the structures in the set of heterogeneous databases, then supplies to the computer on which the method is implemented, via the input means, a set of labels. The result is that one obtains as output a list of answers, where each answer is itself a normalized hyperbase consisting of a subset of the combined hyperbase which contains the set of labels. The list of answers is provided ordered according to a score (also called "distance"), with, preferably, the "best" answer provided first, best in the sense of minimum distance according to some distance criterion. In the various alternative embodiments, different distance measurements are used to define the score. A measurement on a sub-hyperbase is a number determined from the sub-hyperbase.

In a first preferred embodiment, a sub-hyperbase is an answer if (a) it is a connected sub-hyperbase; (b) it contains all of the input labels; and (c) it contains at least one fact node. In an alternate embodiment, criterion (b) is relaxed; it is not necessary for all input labels to be in the sub-hyperbase for it to be an answer. A minimum fraction of the input labels must be in the answer. The distance measurement on a sub-hyperbase for such an alternate embodiment is the number of labels in the sub-hyperbase. In yet another embodiment, different labels can be given different weights so that the presence of some labels in the sub-hyperbase is considered as more important than other labels. How to modify the first preferred embodiment described in detail in this specification to obtain these alternate embodiments will be clear to one in the art.

Optional distance measurement functions for sub-hyperbases

The following are different distance measurement functions on sub-hyperbases that can be used in a query in the method of the present invention:

1. Simple edge count. In this method, one counts the edges in the sub-hyperbase. Each edge is given the same weight.
2. Simple node count. In this variation, one counts the number of passes through the nodes in the sub-hyperbase, where, if there are n edges connected with a node, there are n−1 passes through that node.
3. Full edge count. In this variation, there is a price for each edge in the hyperbase.
4. Full node method. In this variation, there is a price for every pass through node in the graph, where a pass is a edge-node-edge. If more than two edges are connected to node, the price is the minimal group of n−1 passes.
5. Partial edge count method. In this variation, there is price for each "type" of edge, where for this purpose, a "type" is the pair of types of the edge and the node.
6. Partial node method. In this variation, there is a price for each "pass-type" through a node-type. A pass-type is defined by node type, the from direction, the from edge type, the to direction, the to edge type (e.g., up-edge, down-edge, up-equivalence-edge, etc., where up means backwards). Full details are provided below and in the code in the microfiche Appendix submitted herewith.

The preferred embodiment of this invention uses variation number 6. The details of the method are provided below, and uses standard methods for finding minimal connected graphs that would be well-known to those in the art.

Detailed description of the query method in the preferred embodiment

The following is description of the method for carrying out a query in one preferred embodiment of the present invention. The source code for this method is in the microfiche Appendix submitted herewith. Other alternate methods of carrying out the query step of the present invention using the same or different criteria for finding minimal hyperbases would be clear to one in the art The input to a query is a list of labels (words). The method searches a hyperbase and determines the minimum sub-hyperbase according to a "distance" criterion.

In the initialization stage of the query, each one of these labels is looked up in the hyperbase, and added to the hyperbase if it is not present. The nodes corresponding to the input labels are called the sources of the query.

An operation is described by a node N, a direction D (D can be up to a parent, or down to a child) and an edge type T (T can be simple or equivalence).

Expanding the operation means taking all successors (children or parents) of the node N in direction D along edges of type T, and creating all possible operations for these nodes.

The cost of an operation is the number of these successors (children or parents).

At initialization, all possible operations are added for each one of the sources.

Another component of an operation O is (a pointer back to) the operation O' which led to its creation. Thus every operation O=(N,D,T,O') is the head of a linked list of operations, describing a path in the graph from N back to one of the query sources. The distance dist(O) from O back to its source is the distance dist(O'), plus an increment for crossing node N using a lookup table as described below.

The method uses a lookup table defining distance increments, based on the type of the node N, and on the directions and edge types of O and O'. This is termed the distance table, and may specify also some combinations as invalid (preventing the creation of such operations).

A merge is a pair of operations $O_1=(N_1,D_1,T,O'_1)$ and $O_2=(N_2,D_2,T,O'_2)$ with the same edge type, opposite directions $D_1$ and $D_2$, and describing paths back to different sources of the query. A merge describes a path in the hyperbase between two sources of the query.

In the method, one looks for merges during an expansion of an operation, say $O_1$. For every successor $N_2$ of $N_1$ in direction $D_1$ along edges of type T, one checks if there is an operation for $N_2$ that forms a merge with $O_1$. Merges found during expansion are accumulated and processed once the expansion is complete.

A connected region consists of exactly (n−1) merges that touch on (describe paths back to) all of the sources of the query, where n is the number of sources. Thus, exactly one merge is required for two sources, etc.

In the method, one processes a new merge by forming all connected regions in which it participates. This is done by taking every subset of exactly (n−2) of the merges accumulated so far, that, together with the new merge, include all query sources.

In the special case of one source, no merges are necessary to form a connected region. Instead, an answer is given by a path from a fact or sub-fact N back to the source. This path is called half-merge.

In the method, a half-merge (like a merge) is identified during expansion of an operation leading to n, and processed following completion of the expansion.

Even for more than one source, a connected region must also include a half-merge if none of the paths from it merges back to sources passes through a fact or sub-fact.

This requirement guarantees that connected regions contain a fact or sub-fact.

In the method, if a new connected region is found, it is reported as an answer of the query, in the form of the list of display nodes and maximal sub-display nodes in the connected region.

The main routine in the method maintains a record of all operations created during the course of the query, and of pending operations that have not been expanded yet. Initially, these are the operations that have been created for the sources (in all permissible directions and edge types).

To generate answers, the method performs a series of expansion steps, each one followed by processing of new merges if needed, and reporting of new answers if found. This continues until no more answers are requested or no more answers may be found.

At each expansion step, the method expands a pending operation with least distance, belonging to a source with minimal overall cost for pending operations. This has the effect of a breadth-first expansion (keyed by distance) from each of the sources separately, with alternation between the sources depending on the effort required to expand them.

If no pending operations remain for a source (that does not have a half-merge) then it is deleted. If no pending operations remain for the query then it has no more answers.

Implementation of the above method in the form of computer source code is provided in the microfiche Appendix submitted herewith.

F. Data Display: Displaying the Result

After the query is performed, the answer(s) are output to the user. This is called data display.

There are several alternatives to displaying an answer to a query. An answer is itself a hyperbase, which can be displayed in various ways:

a. Displaying the hyperbase graphically on a graphic display or printer.

b. Displaying a nested set of labels. For example, ((ID 001)(NAME (John Smith)))

c. Displaying a minimal list of "display nodes" covering the hyperbase, where covering means that each element in the hyperbase is either a child or a parent of a fact.

d. Each display node could have its own particular (and possibly external) display method. A display node would then be displayed according to its particular display method.

e. The display method could use information about other nodes connected to the display node being displayed.

Thus a method for carrying out an associative search on heterogeneous databases is disclosed.

Although the present invention has been described in terms of the presently preferred embodiments, it is to be understood that the disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

V. Appendix

```
//   The following source code (query.c) describes how to find minimum
//   sub-hyperbase as defined in the patent.
/*   programmer's interface to query.c
     *****************************************/
//   define new query
Erromo new_query      (char *in_query,         // the query text
                      Id *query_id,            // return query id
                      Id *query_output_id);    // not used
//   get an element from a virtual array of answer.
//   (each answer is a node-in-graph Id. its text can be later retrievd
//   using get_phrase()
Erromo get_query_item (Id query_id,            // the query id
                      Num answer_num,          // position of answer
                      Id *result_id);          // The result node-id
//   close the query (release memory held for the query )
Erromo close_query(Id query_id);
//   ************************************
//   query.c uses the following modules:
//   ************************************
/*   interface to storage (memory, swappable to disk )
     *****************************************************/
//   each memory chunk is called object, and has an unique Id
Erromo new_object (Id *id ,                    // returned object's id
                  Object_type type,            // type of object
                  Object_store in_store,       // permanent/persistant
                  Object_length length,        // requested length
                  Object **objptr);            // returned memory pointer
//   delete (release from memory)
Erromo delete_object (Id in_id,                // Object-id
```

V. Appendix -continued

```
                  Object_type in_type);        // object type
//   get pointer of object-id
Erromo get_object (Id in_id,                   // object-id
                  Object_type in_type ,        // object type
                  Object **in_ptr_ptr,         // returned pointer
                  Get_kind get_kind,           // get/search?
                  Get_reason get_reason );     // read/modify?
//   release lock from object
Erromo release_object ( Object **objptr,       // memory pointer
                  Get_reason reason);          // read/modify
/*   interface to set_manager
     **************************  */
/*   a set is kept as an object, and contains element which
     are defined by element_parameters variables.
     various standart actions can be made */
Erromo insert_id _to_set (Object **objptr,
                  Set_ptr *id_set,
                  Element_parameters *element_parameters,
                  void *in_element,
                  Set_count in_pos,
                  int *exist);
Erromo delete_id_from_set (Object **objptr,
                  Set_ptr *id_set,
                  Element_parameters *element_parameters,
                  void *in_element,
                  Set_count in_pos,
                  int *exist);
Erromo set_update_element (Object **objptr,
                  Set_ptr id_set,
                  Element_parameters *element_parameters,
                  void *in_element,
                  Set_count in_pos,
                  int *exist);
Erromo set_clear(Object **objptr,
                  Set_ptr *id_set,
                  Element_parameters *element_parms);
Erromo set_get_element (Set_ptr id_set,
                  Element_parameters *element_parameters,
                  void *out_element,
                  Set_count in_pos,
                  int *exist);
Erromo set_empty(Set_ptr set,int *empty);
Erromo set_merje(Set_ptr from_set,
                  Object **to_obj,
                  Set_ptr *to_set,
                  Element_parameters *element_parameters);
Erromo open_set_cursor ( Set_cursor *cursor);
Erromo next_set_cursor ( Set_cursor *cursor ,
                  Set_ptr set,
                  void *element_start,
                  void *element_end,
                  Element_parameters *elemet_parms,
                  int *more);
Erromo close_set_cursor  ( Set_cursor *cursor );
Erromo set_count (        Set_ptr in_set,
                  Element_parameters *in_parms,
                  Set_count *count);
Erromo open_set_updator ( Set_cursor *cursor);
Erromo set_collapse(Set_ptr from_set,
                  Object **to_obj,
                  Set_ptr *to_set,
                  Element_parameters *element_parms);
Erromo set_compare (Set_ptr from_set,
                  Set_ptr to_set,
                  Element_parameters *element_parms,
/*   interface to bag_manager
     ************************  */
//   bags are objects that contain one set
Erromo bag_create( Id *list_id,
                  Object_type in_type,
                  Object_store in_store,
                  Set_type list_type,
                  Element_parameters *element_parameters,
                  Object **objptr);
Erromo bag_delete (Object **objptr,
                  Element_parameters *element_parameters);
/*   interface to node manager
     *************************  */
```

V. Appendix

```
//  nodes in the graph are kept as objects, which have set of fathers,
//  set of sons, id of reference and label (string or reference id)
Set_ptr sons_of_abstraction ( Object *objptr);
Set_ptr fathers_of_abstraction (Object *objptr);
Errorno delete_abstraction(Id in_id)
Id subject_of_abstraction_as_label (Object *objptr);  // referred node
int abstraction_has_phrase_fathers(Object *objptr);
Id reference_label_of_abstraction(Object *objptr);
/*  interface to phrase_manager
    ***************************   */
//  phrase is a text that defines a part of the graph
//  phrases can be stored in the graph (add phrase)
//  or can be retrieved giving a node (make a phrase from
//  all the nodes below this node
Errorno add_phrase(    Abs_type in_abs_type,
                       char **in_asso,
                       char *end_asso,
                       char delimiter[],
                       Id *result_id,
                       Object **phrase_obj,
                       int level,
                       int *exist,
                       int *was_phrase);
Errorno get_phrase(    Id asso ,
                       char **asso_text ,
                       char *end_in_buffer,
                       char delimiter[],
                       int level,
                       Abs_color *abs_color,
                       int *abs_is_phrase,
/*  interface to distance table
    ***************************   */
//  this routine returns distance and cost to to specific passes
//  through node
PROC compute_dists_and_costs(Object *obj,
                       Dist *p_dist_vee,
                       Dist *p_dist_slash,
                       Dist *p_dist_wedge,
                       Cost *p_cost_up,
                       Cost *p_cost_down,
                       Flag *p_is_psp);
----------------end of programmers interface-------------------
```

What is claimed is:

1. A method of searching a set of heterogeneous databases, each database in said set having a corresponding hyperbase, said method implemented on a computer and comprising:

(a) determining said corresponding hyperbase for at least one of said set of heterogeneous databases dependent on whether or not the corresponding hyperbase for said at least one of the set of heterogeneous databases is already determined;

(b) integrating the hyperbases corresponding to each database of said set of databases into a combined hyperbase dependent on whether or not all the corresponding hyperbases already have been integrated into the combined hyperbase;

(c) inputting a query into said computer, said query including a set of labels; and (d) determining an answer to said query from said combined hyperbase.

2. A method for accessing information from a heterogeneous plurality of databases with each of said databases having a plurality of data and each of said databases having a corresponding schema free data model, the method comprising the steps of:

(a) creating a combined schema-free data model from said plurality of data from some of said databases, said creating including:

(i) determining at least part of the corresponding schema-free data model for at least one of said some of said databases dependent on whether or not the at least part of the corresponding hyperbase for said at least one of some of said databases is already determined, and (ii) integrating said at least part of the corresponding schema-free data model to into the combined schema-free model depending on whether or not said at least part already has been integrated in the combined schema-free data model; and (b) returning an answer as a result of an associative search on said combined schema-free data model for at least one of a plurality of items of information.

3. The method of claim 2 wherein said plurality of items of information is a plurality of words.

4. The method of claim 2 wherein said combined schema-free data model is a combined hyperbase comprising a plurality of elements, said plurality of elements comprising nodes, labels, and edges.

5. The method of claim 2 wherein step (a)(i) further comprises:

(a1) creating a plurality of nodes based on said plurality of data;

(a2) attaching a label containing some of said plurality of data to at least one of said plurality of nodes; and (a3) connecting said plurality of nodes by a plurality of edges.

6. The method of claim 2 wherein said step (a)(i) further comprises:

(a1) creating a table name node;

(a2) creating a table node;

(a3) creating a column name node;

(a4) creating a column node;

(a5) creating a row node; and (a6) creating a plurality of edges, at least one of said plurality of edges being between said table node and said table name node, at least one of said edges being between said column name node and said column node, at least one of said edges being between said table node and said row node, and at least one of said edges being between said row node and said column node.

7. The method of claim 6 wherein step (a5) further comprises:

(a7) creating a row name node; and (a8) creating a row name edge between said row name node and said row node.

8. The method of claim 2 wherein said step (a)(i) further comprises:

(a1) creating a note node;

(a2) creating a line node;

(a3) creating a word node with a label containing a word; and (a4) creating a plurality of edges, one of said plurality of edges being between said note node and said line node, and one of said plurality of edges being between said line node and said word node.

9. The method of claim 2 wherein said step (a)(i) further comprises:

(a1) creating a thesaurus node;

(a2) creating a plurality of word nodes each respectively associated with a corresponding label; and (a3) creating a plurality of edges from said thesaurus node to said plurality of word nodes.

10. The method of claim 2 wherein step (a) further comprises a step of normalizing said combined schema-free data model.

11. The method of claim 10 wherein said step of normalizing further comprises:
  (a1) locating a non-leaf node with a label;
  (a2) creating a new node;
  (a3) unassociating said label from said non-leaf node;
  (a4) associating said label with said new node; and
  (a5) creating an equivalence edge from said new node to said non-leaf node.

12. The method of claim 10 wherein said step of normalizing further comprises;
  (a1) locating a plurality of nodes each with a label having identical information, said plurality of nodes having a set of parents and a set of children;
  (a2) creating a new node with one of said labels;
  (a3) associating said set of parents with said new node; and
  (a4) associating said set of children with said new mode.

13. The method of claim 12 further comprising:
  (a5) unassociating said set of children from said plurality of nodes; and
  (a6) unassociating said set of parents from said plurality of nodes.

14. The method of claim 10 wherein said step of normalizing further comprises:
  (a1) locating a plurality of nodes referenced by a single reference node, said plurally of nodes having a set of parents and a set of children;
  (a2) creating a new node;
  (a3) associating said set of parents with said new node;
  (a4) associating said set of children with said new node; and
  (a5) creating an equivalence edge from said single reference node to said new node.

15. The method of claim 14, further comprising:
  (a6) unassociating said set of parents from said plurality of nodes;
  (a7) unassociating said plurality of nodes from said single reference node; and
  (a8) unassociating said set of children from said plurality of nodes.

16. The method of claim 10 wherein said step of normalizing further comprises:
  (a1) locating a plurality of non referred node with a set of parents, each of said plurality of non referred nodes having an identical set of children and each of said plurality of non referred nodes not having a label;
  (a2) creating a new node;
  (a3) associating said set of parents with said new node; and
  (a4) associating said identical set of children with said new node.

17. The method of claim 16, further comprising:
  (a5) unassociating said set of parents from said plurality of nodes; and
  (a6) unassociating said set of children from said plurality of nodes.

18. The method of claim 10 wherein said step of normalizing further comprises:
  (a1) locating a plurality of identical labels associated with a set of nodes, said plurality of identical labels having a first label and a second plurality of labels;
  (a2) associating said set of nodes with a first label of said plurality of identical labels; and
  (a3) unassociating said second plurality of labels.

19. The method of claim 2 wherein each of said corresponding schema-free data models is a corresponding hyperbase and the combined schema-free data model is a combined hyperbase.

20. The method of claim 19 wherein the step (a)(ii) of integrating said at least part further comprises taking a union of said part with at least a subset of the combined hyperbase.

21. The method of claim 2 wherein step (b) further comprises:
  (b2) searching said combined schema-free data model for some of said plurality of items of information.

22. The method of claim 21 wherein step (b) further comprises:
  (b1) adding one of said plurality of items of information to said combined schema-free data model.

23. The method of claim 4 wherein step (b) further comprises:
  (b1) designating at least one of said nodes as a source node dependent on an input label;
  (b2) adding an operation to said source node;
  (b3) expanding said operation; and
  (b4) identifying a sub-hyperbase as said answer wherein said sub-hyperbase is connected, contains a fact node and contains said input label.

24. The method of claim 23 wherein said sub-hyperbase is a minimum sub-hyperbase determined by a distance criterion, wherein said distance criterion is determined using a simple edge function, a simple node function, a full edge function, a full node function, a partial edge function, or a partial node function.

25. The method of claim 23 wherein step (b4) further comprises accumulating at least one merge.

26. The method of claim 2 wherein step (b) further comprises displaying said answer.

27. The method of claim 26 wherein said schema-free, data model includes a plurality of display nodes and said answer comprises a minimal list of said plurality of display nodes covering said schema-free data model.

28. An apparatus for accessing information from a heterogeneous plurality of databases with each of said databases having a plurality of data, and each of said databases having a corresponding schema free data model, said apparatus having a central processing unit (CPU), a memory, and a file system containing said heterogeneous plurality of databases, said apparatus comprising:
  a model creation mechanism, using said CPU and said memory, configured to create at least part of the corresponding schema-free data model for at least one of said databases dependent on whether or not the at least part of the corresponding hyperbase for said at least one of said databases has already been created, said creating including accessing said plurality of data in said at least one of said databases in said file system;
  an integration mechanism, using said CPU and said memory, configured to integrate said at least part of the corresponding hyperbase to a combined schema-free model depending on whether or not said at least part already has been integrated in the combined schema-free data model; and an associative search mechanism, using said CPU and said memory, configured to perform an associative search on said combined schema-free data model created by the model creation mechanism and the integration mechanism for at least one of a plurality of items of information, said associative search mechanism configured to return an answer.

29. The apparatus of claim 28 wherein said plurality of items of information is a plurality of words.

30. The apparatus of claim 28 wherein said combined schema-free data model is a combined hyperbase comprising a plurality of elements, said plurality of elements comprising nodes, labels, and edges connecting said nodes and said labels.

31. The apparatus of claim 28 wherein the model creation mechanism further comprises:

a node creation mechanism configured to create a plurality of nodes based on said plurality of data;

a label attachment mechanism configured to attach a label containing some of said plurality of data to at least one of said plurality of nodes; and a node connection mechanism configured to connect said plurality of nodes by a plurality of edges.

32. The apparatus of claim 31 wherein the model creation mechanism further comprises:

a table name creation mechanism configured to create a table name node;

a table creation mechanism configure to create a table node;

a column name creation mechanism configured to create a column name node;

a column creation mechanism configured to create a column node;

a row creation mechanism configured to create a row node; and an edge creation mechanism configured to create a plurality of edges, at least one of said plurality of edges being between said table node and said table name node, at least one of said edges being between said column name node and said column node, at least one of said edges being between said table node and said row node, and at least one of said edges being between said row node and said column node.

33. The apparatus of claim 32 wherein the row creation mechanism further comprises:

a row name creation mechanism configured to create a row name node; and a row connection mechanism configured to connect said row name node and said row node by a row name edge between said row name node and said row node.

34. The apparatus of claim 28 wherein the model creation mechanism further comprises:

a note node creation mechanism configured to create a note node;

a line creation mechanism configured to create a line node;

a label creation mechanism configured to create a word node with a label containing a word; and an edge creation mechanism configured to create a plurality of edges, one of said plurality of edges being between said note node and said line node, and one of said plurality of edges being between said line node and said word node.

35. The apparatus of claim 28 wherein the model creation mechanism further comprises:

a thesaurus node creation mechanism configured to create a thesaurus node;

a word node creation mechanism configured to create a plurality of word nodes each respectively associated with a corresponding label; and an edge creation mechanism configured to create a plurality of edges from said thesaurus node to said plurality of word nodes.

36. The apparatus of claim 28 further comprising a normalization mechanism configured to normalize said combined schema-free data model.

37. The apparatus of claim 36 wherein said normalization mechanism further comprises:

a node location mechanism configured to locate a non-leaf node with a label;

a node creation mechanism configured to create a new node;

a label unassociation mechanism configured to unassociate said label from said non-leaf node;

a label association mechanism configured to associate said label with said new node; and an equivalent edge creation mechanism configured to create an equivalence edge from said new node to said non-leaf node.

38. The apparatus of claim 36 wherein said normalization mechanism further comprises:

a label location mechanism configured to locate a plurality of nodes each with a label having identical information, said plurality of nodes with a set of parents and a set of children;

a label creation mechanism configured to create a new node with one of said labels;

a parent node association mechanism configured to associate said set of parents with said new node;

a child association mechanism configured to associate said set of children with said second new node; and an edge creation mechanism configured to create an equivalence edge from said first new node to said second new node.

39. The apparatus of claim 38, further comprising:

a parent unassociation mechanism configured to unassociate said set of parents from said plurality of nodes; and a child unassociation mechanism configured to unassociate said set of children from said plurality of nodes.

40. The apparatus of claim 36 wherein said normalization mechanism further comprises:

a single reference node location mechanism configured to locate a plurality of nodes referenced by a single reference node, said plurality of nodes with a set of parents and a set of children;

a node creation mechanism configured to create a new node;

a parent association mechanism configured to associate said set of parents with said new node;

a child association mechanism configured to associate said set of children with said new node; and an equivalence mechanism configured to create an equivalence edge from said single reference node to said new node.

41. The apparatus of claim 40, further comprising:

a parent unassociation mechanism configured to unassociate said set of parents from said plurality of nodes;

a second unassociation mechanism configured to unassociate said plurality of nodes from said single reference node; and a child unassociation mechanism configured to unassociate said set of children from said plurality of nodes.

42. The apparatus of claim 36 wherein said normalization mechanism further comprises:

a single reference node location mechanism configured to locate a plurality of non referred nodes with a set of parents, each of said plurality of non referred nodes with an identical set of children and each of said plurality of non referred nodes without a label;

a node creation mechanism configured to create a new node;

a parent association mechanism configured to associate said set of parents with said new node; and child association mechanism configured to associate said identical set of children with said new node.

43. The apparatus of claim 42, further comprising:

parent unassociation mechanism configured to unassociate said set of parents from said plurality of nodes; and a child unassociation mechanism configured to unassociate said set of children from said plurality of nodes.

44. The apparatus of claim 36 wherein the normalization mechanism further comprises:

a label location mechanism configured to locate a plurality of identical labels associated with a set of nodes, said plurality of identical labels with a first label and a second plurality of labels;

an association mechanism configured to associate said set of nodes with a first label of said plurality of identical labels; and an unassociation mechanism configured to unassociate said second plurality of labels.

45. The apparatus of claim 28 wherein each of said corresponding schema-free data models is a corresponding hyperbase and the combined schema-free data model is a combined hyperbase.

46. The apparatus of claim 45 wherein the integration mechanism further comprises a union mechanism configured to take a union of said part with at least a subset of the combined hyperbase.

47. The apparatus of claim 28 wherein the associative search mechanism further comprises:

a search mechanism configured to search said combined schema-free data model for each of said plurality of items of information.

48. The apparatus of claim 47 wherein the associative search mechanism further comprises:

an information addition mechanism configured to add one of said plurality of items of information to said combined schema-free data model.

49. The apparatus of claim 30 wherein the associative search mechanism further comprises:

a designation mechanism configured to designate at least one of said nodes as a source node dependent on an input label;

an initialization mechanism configured to add an operation to said source node;

an expansion mechanism configured to expand said operation; and an identification mechanism configured to identify a sub-hyperbase as said answer, wherein said sub-hyperbase is connected, contains a fact node and contains said input label.

50. The apparatus of claim 49 wherein said sub-hyperbase is a minimum sub-hyperbase determined by a distance criterion, wherein said distance criterion is determined using a simple edge function, a simple node function, a full edge function, a full node function, a partial edge function, or a partial node function.

51. The apparatus of claim 49 wherein said identification mechanism further comprises a merge accumulation mechanism configured to accumulate at least one merge.

52. The apparatus of claim 28 wherein the search mechanism further comprises a display mechanism configured to display said answer.

53. The apparatus of claim 52 wherein said schema-free data model includes a plurality of display nodes and said answer comprises a minimal list of said plurality of display nodes covering said schema-free data model.

54. The apparatus of claim 30 wherein the associative search mechanism further comprises:

means for designating at least one of said nodes as a source node dependent on an input label;

means for adding an operation to said source node;

means for expanding said operation; and means for identifying a sub-hyperbase as said answer.

55. A computer program product comprising:

a computer usable storage medium with computer readable code embodied therein for causing a computer to access information from a heterogeneous plurality of databases with each of said databases having a plurality of data and each of said databases having a corresponding schema free data model, and wherein said computer readable code comprises:

computer readable program code devices configured to cause said computer to effect a model creation mechanism configured to create at least part of the corresponding schema-free data model for at least one of said databases dependent on whether or not the at least part of the corresponding hyperbase for said at least one of said databases has already been created, said creating including accessing said plurality of data in said at least one of said databases;

computer readable program code devices configured to cause said computer to effect an integration mechanism configured to integrate said at least part of the corresponding hyperbase to a combined schema-free model depending on whether or not said at least part already has been integrated in the combined schema-free data model; and computer readable program code devices configured to cause said computer to effect an associative search mechanism configured to perform an associative search on said combined schema-free data model for at least one of a plurality of items of information, said associative search mechanism configured to return an answer.

56. The computer program product of claim 55 wherein said plurality of items of information is a plurality of words.

57. The computer program product of claim 55 wherein said schema-free data model is a combined hyperbase in said memory comprising a plurality of elements, said plurality of elements comprising nodes, labels, and edges connecting said nodes and said labels.

58. The computer program product of claim 55 wherein the model creation mechanism further comprises:

computer readable program code devices configured to cause said computer to effect a node creation mechanism configured to create a plurality of nodes based on said plurality of data;

computer readable program code devices configured to cause said computer to effect a label attachment mechanism configured to attach a label containing some of said plurality of data to at least one of said plurality of nodes; and computer readable program code devices configured to cause said computer to effect a node connection mechanism configured to connect said plurality of nodes by a plurality of edges.

59. The computer program product of claim 58 wherein the model creation mechanism further comprises:

computer readable program code devices configured to cause said computer to effect a table name creation mechanism configured to create a table name node;

computer readable program code devices configured to cause said computer to effect a table creation mechanism configured to create a table node;

computer readable program code devices configured to cause said computer to effect a column name creation mechanism configured to create a column name node;

computer readable program code devices configured to cause said computer to effect a column creation mechanism configured to create a column node;

computer readable program code devices configured to cause said computer to effect a row creation mechanism configured to create a row node; and computer readable program code devices configured to cause said computer to effect an edge creation mechanism configured to create a plurality of edges, at least one of said plurality of edges being between said table node and said table name node, at least one of said edges being between said column name node and said column node, at least one of said edges being between said table node and said row node, and at least one of said edges being between said row node and said column node.

60. The computer program product of claim 59 wherein the row creation mechanism further comprises:

computer readable program code devices configured to cause said computer to effect a row name creation mechanism configured to create a row name node; and computer readable program code devices configured to cause said computer to effect a row connection mechanism configured to connect said row name node and said row node by a row name edge between said row name node and said row node.

61. The computer program product of claim 55 wherein the model creation mechanism further comprises:

computer readable program code devices configured to cause said computer to effect a note node creation mechanism configured to create a note node;

computer readable program code devices configured to cause said computer to effect a line creation mechanism configured to create a line node;

computer readable program code devices configured to cause said computer to effect a label creation mechanism configured to create a word node with a label containing a word; and computer readable program code devices configured to cause said computer to effect an edge creation mechanism configured to create a plurality of edges, one of said plurality of edges being between said note node and said line node, and one of said plurality of edges being between said line node and said word node.

62. The computer program product of claim 55 wherein the model creation mechanism further comprises:

computer readable program code devices configured to cause said computer to effect a thesaurus node creation mechanism configured to create a thesaurus node;

computer readable program code devices configured to cause said computer to effect a word node creation mechanism configured to create a plurality of word nodes each respectively associated with a corresponding label; and computer readable program code devices configured to cause said computer to effect an edge creation mechanism configured to create a plurality of edges from said thesaurus node to said plurality of word nodes.

63. The computer program product of claim 55 further comprising computer readable program code devices configured to cause said computer to effect a normalization mechanism configured to normalize said combined schema-free data model.

64. The computer program product of claim 63 wherein said normalization mechanism further comprises:

computer readable program code devices configured to cause said computer to effect a node location mechanism configured to locate a non-leaf node with a label;

computer readable program code devices configured to cause said computer to effect a node creation mechanism configured to create a new node;

computer readable program code devices configured to cause said computer to effect a label unassociation mechanism configured to unassociate said label from said non-leaf node;

computer readable program code devices configured to cause said computer to effect a label association mechanism configured to associate said label with said new node; and computer readable program code devices configured to cause said computer to effect an equivalent edge creation mechanism configured to create an equivalence edge from said new node to said non-leaf node.

65. The computer program product of claim 63 wherein said normalization mechanism further comprises:

computer readable program code devices configured to cause said computer to effect a label location mechanism configured to locate a plurality of nodes each with a label having identical information, said plurality of nodes with a set of parents and a set of children;

computer readable program code devices configured to cause said computer to effect a label creation mechanism configured to create a new node with one of said labels;

computer readable program code devices configured to cause said computer to effect a parent node association mechanism configured to associate said set of parents with said new node;

computer readable program code devices configured to cause said computer to effect a child association mechanism configured to associate said set of children with said second new node; and computer readable program code devices configured to cause said computer to effect an edge creation mechanism configured to create an equivalence edge from said first new node to said second new node.

66. The computer program product of claim 65, further comprising:

computer readable program code devices configured to cause said computer to effect a parent unassociation mechanism configured to unassociate said set of parents from said plurality of nodes; and computer readable program code devices configured to cause said computer to effect a child unassociation mechanism configured to unassociate said set of children from said plurality of nodes.

67. The computer program product of claim 63 wherein said normalization mechanism further comprises:

computer readable program code devices configured to cause said computer to effect a single reference node location mechanism configured to locate a plurality of nodes referenced by a single reference node, said plurality of nodes with a set of parents and a set of children;

computer readable program code devices configured to cause said computer to effect a node creation mechanism configured to create a new node;

computer readable program code devices configured to cause said computer to effect a parent association mechanism configured to associate said set of parents with said new node;

computer readable program code devices configured to cause said computer to effect a child association mechanism configured to associate said set of children with said new node; and computer readable program code devices configured to cause said computer to effect an equivalence mechanism configured to create an equivalence edge from said single reference node to said new node.

68. The computer program product of claim 67, further comprising:

computer readable program code devices configured to cause said computer to effect a parent unassociation mechanism configured to unassociate said set of parents from said plurality of nodes;

computer readable program code devices configured to cause said computer to effect a second unassociation mechanism configured to unassociate said plurality of nodes from said single reference node; and computer readable program code devices configured to cause said computer to effect a child unassociation mechanism configured to unassociate said set of children from said plurality of nodes.

69. The computer program product of claim 63 wherein said normalization mechanism further comprises:

computer readable program code devices configured to cause said computer to effect single reference node location mechanism configured to locate a plurality of non referred nodes having a set of parents, each of said plurality of non referred nodes having an identical set of children and each of said plurality of non referred nodes without a label;

computer readable program code devices configured to cause said computer to effect a node creation mechanism configured to create a new node;

computer readable program code devices configured to cause said computer to effect a parent association mechanism configured to associate said set of parents with said new node;

computer readable program code devices configured to cause said computer to effect child association mechanism configured to associate said identical set of children with said new node.

70. The computer program product of claim 69, further comprising computer readable program code devices configured to cause said computer to effect parent unassociation mechanism configured to unassociate said set of parents from said plurality of nodes; and computer readable program code devices configured to cause said computer to effect a child unassociation mechanism configured to unassociate said set of children from said plurality of nodes.

71. The computer program product of claim 63 wherein said normalization mechanism further comprises:

computer readable program code devices configured to cause said computer to effect a label location mechanism configured to locate a plurality of identical labels associated with a set of nodes, said plurality of identical labels with a first label and a second plurality of labels;

computer readable program code devices configured to cause said computer to effect an association mechanism configured to associate said set of nodes with a first label of said plurality of identical labels; and computer readable program code devices configured to cause said computer to effect an unassociation mechanism configured to unassociate said second plurality of labels.

72. The computer program product of claim 55 wherein each of said corresponding schema-free data models is a corresponding hyperbase and the combined schema-free data model is a combined hyperbase.

73. The computer program product of claim 72 wherein the integration mechanism further comprises computer readable program code devices configured to cause said computer to effect a union mechanism configured to take a union of said part with at least a subset of the combined hyperbase.

74. The computer program product of claim 55 wherein the associative search mechanism further comprises:

computer readable program code devices configured to cause said computer to effect a search mechanism configured to search said combined schema-free data model for each of said plurality of items of information.

75. The computer program product of claim 74 wherein the associative search mechanism further comprises:

computer readable program code devices configured to cause said computer to effect an information addition mechanism configured to add one of said plurality of items of information to said combined schema-free data model.

76. The computer program product of claim 57 wherein the associative search mechanism further comprises:

computer readable program code devices configured to cause said computer to effect a designation mechanism configured to designate at least one of said nodes as a source node dependent on an input label;

computer readable program code devices configured to cause said computer to effect an initialization mechanism configured to add an operation to said source node;

computer readable program code devices configured to cause said computer to effect an expansion mechanism configured to expand said operation; and computer readable program code devices configured to cause said computer to effect an identification mechanism configured to identify a sub-hyperbase as said answer, wherein said sub-hyperbase is connected, contains a fact node and contains said input label as said answer.

77. The computer program product of claim 76 wherein said sub-hyperbase is a minimum sub-hyperbase determined by a distance criterion, wherein said distance criterion is determined using a simple edge function, a simple node function, a full edge function, a full node function, a partial edge function, or a partial node function.

78. The computer program product of claim 76 wherein said identification mechanism further comprises a merge accumulation mechanism configured to accumulate at least one merge.

79. The computer program product of claim 55 wherein the search mechanism further comprises a plurality of computer readable program code devices configured to cause said computer to effect a display mechanism configured to display said answer.

80. The computer program product of claim 79 wherein said schema-free data model includes a plurality of display nodes and said answer comprises a minimal list of said plurality of display nodes covering said schema-free data model.

81. The computer program product of claim 57 wherein the associative search mechanism further comprises:

computer readable program code devices configured to cause said computer to effect a means for designating at least one of said nodes as a source node dependent on an input label;

computer readable program code devices configured to cause said computer to effect a means for adding an operation to said source node;

computer readable program code devices configured to cause said computer to effect a means for expanding said operation; and computer readable program code devices configured to cause said computer to effect a means for identifying a sub-hyperbase as said answer.

82. An apparatus for searching a set of heterogeneous databases, each database in said set having a corresponding hyperbase, said apparatus having a central processing unit (CPU), a memory, and a file system, said memory and said file system accessible by said CPU, said apparatus comprising:

a determination mechanism configured to determine said corresponding hyperbase for one of said set of heterogeneous databases dependent on whether said corresponding hyperbase is already determined;

an integration mechanism configured to integrate said hyperbases corresponding to each database of said set of databases into a combined hyperbase;

a query mechanism configured to input a query into said CPU, said query including a set of labels; and an answer determination mechanism configured to determine an answer to said query.

83. A computer program product comprising:

a computer usable storage medium with computer readable code embodied therein for causing a computer to access information from a heterogeneous plurality of databases with each of said databases having a plurality of data and wherein said computer readable code comprises:

computer readable program code devices configured to cause said computer to effect a determination mechanism configured to determine said corresponding hyperbase for one of said set of heterogeneous databases dependent on whether said corresponding hyperbase is already determined;

computer readable program code devices configured to cause said computer to effect an integration mechanism configured to integrate said hyperbases corresponding to each database of said set of databases into a combined hyperbase;

computer readable program code devices configured to cause said computer to effect a query mechanism configured to input a query into said computer, said query including a set of labels; and computer readable program code devices configured to cause said computer to effect an answer determination mechanism configured to determine an answer to said query.

84. A memory for storing data for access by an application program being executed on a computer, comprising:

some of a combined schema-free data model in said memory; the combined schema-free data model constructed from integrating at least some of a set of corresponding schema fee data models, each corresponding schema free data model corresponding to one of a heterogeneous plurality of databases, each of said plurality of databases comprising a plurality of items of information, said combined schema-free data model comprising:

a plurality of nodes connected by a plurality of edges, said plurality of nodes comprising a display node and a fact node;

a label containing one of said plurality of items of information;

said plurality of edges comprising a directed edge and an equivalence edge; and said plurality of edges connecting said label and said plurality of nodes.

85. The method of claim 1 further comprising the step of:

(f) normalizing said combined hyperbase into a normalized hyperbase, wherein said step d of determining determines the answer from the normalized hyperbase.

86. The method of claim 1 wherein said answer is a subhyperbase.

87. The method of claim 1 wherein said answer includes said set of labels.

88. The method of claim 86 wherein said subhyperbase is a minimum sub-hyperbase determined by a distance criterion, wherein said distance criterion is determined using a simple edge function, a simple node function, a full edge function, a full node function, a partial edge function, or a partial node function.

* * * * *